(12) United States Patent
Hall et al.

(10) Patent No.: US 7,444,342 B1
(45) Date of Patent: Oct. 28, 2008

(54) SYSTEM FOR ACCESSING AND TRANSFORMING DATA, INFORMATION AND DATA RELATIONAL RULES IN A MULTI-DIMENSIONAL DATABASE

(75) Inventors: Julie L. Hall, Phoenix, AZ (US); Kevin Kinsey, Decatur, GA (US); Ray Minh Huynh, Tyrone, GA (US)

(73) Assignee: Unisys Corporation, Blue Bell, PA (US)

( * ) Notice: Subject to any disclaimer, the term of this patent is extended or adjusted under 35 U.S.C. 154(b) by 478 days.

(21) Appl. No.: 11/016,255

(22) Filed: Dec. 17, 2004

Related U.S. Application Data

(60) Provisional application No. 60/599,472, filed on Aug. 6, 2004.

(51) Int. Cl.
 *G06F 17/30* (2006.01)
(52) U.S. Cl. .................................. 707/100; 707/104.1
(58) Field of Classification Search ............. 707/104.1, 707/100; 717/100; 719/328
 See application file for complete search history.

(56) References Cited

U.S. PATENT DOCUMENTS

2003/0046448 A1 * 3/2003 Fischer et al. ............... 709/328

* cited by examiner

*Primary Examiner*—Cheryl Lewis
(74) *Attorney, Agent, or Firm*—Richard J. Gregson; Robert P. Marley

(57) ABSTRACT

A mobile integration engine application services component for accessing data and information stored in at least one multi-dimensional database and for presenting the accessed data and information to a browser-based application. The mobile integration engine application services component reads and translates the data and information, which includes data and information relating to critical business metrics as well as the data relational rules that govern the relationship of the data, and then creates markup language describing the accessed data and information for presentation to the browser-based application. An orthogonal drill mechanism creates a "drill-across" path from a first dimension to any other orthogonal dimension having a related dimension measure, allowing navigation between the orthogonal dimensions.

33 Claims, 22 Drawing Sheets

A. Year
B. Year - 2004
C. Year - 2003
D. 2004 - January
E. 2004 - February
F - 2003 - January
G - 2003 - February 1. Nation
2. PHX Hub
3. CVG Hub
4. PHX - ATL Inbound
5. PHX - LAX Inbound
6. CVG - SLC Inbound
7. CVG - CDG Inbound 600    ExecuPoint℠                           Measure <u>Industry</u> > <u>Home</u> > Mishandled Baggage — 500
Mishandled Baggage

504 — <u>Nation</u>
Target: 6 Bags/1K passenger       Current Value: 4

On-Target

Alternative Paths

502 — <u>Year</u>

© Unisys 2004                                 <u>Home</u> | <u>Logout</u>

```
600
```

ExecuPoint℠                                          Metric Detail
_____

<u>Industry</u> > <u>Home</u> > <u>Mishandled Baggage</u> > Nation
                                                    ↳ 500

504 ── <u>Nation</u>

Target: 6 Bags/1K passenger

Measure: 4 Bags/1K passenger
Lower numbers are better.

Deviation: -33%
Status is On-Target

Sub-metrics

504a ── <u>PHX Hub</u> 4

504b ── <u>CVG Hub</u> 4

Alternate Paths

502 ── <u>Year</u>

© Unisys 2004                                    <u>Home</u> | <u>Logout</u>

A. Year
B. Year - 2004
C. Year - 2003
D. 2004 - January
E. 2004 - February
F - 2003 - January
G - 2003 - February

| 600 | ExecuPoint℠ | Metric Detail |

Industry > Home > Mishandled Baggage > Nation > Year           500        504

502 ⌒ Year

Target: 6 Bags/1K passenger

Measure: 4 Bags/1K passenger
Lower numbers are better.

Deviation: -33%
Status is On-Target

Sub-metrics

502a ⌒ 2003    4
▪▪▪▪▪▪▪▪▪▪▪▪▪▪▪

502b ⌒ 2004    4
▪▪▪▪▪▪▪▪▪▪▪▪▪▪▪

© Unisys 2004                Home | Logout

SYSTEM FOR ACCESSING AND TRANSFORMING DATA, INFORMATION AND DATA RELATIONAL RULES IN A MULTI-DIMENSIONAL DATABASE

CROSS-REFERENCE TO RELATED APPLICATIONS

This application is related to:

U.S. patent application Ser. No. 10/913,078, entitled "System and Wireless Device for Providing in Real-Time, Contextually-Based, Business Operational Data and Business Intelligence Information" (Hall et al.), filed Aug. 6, 2004; and, U.S. patent application Ser. No. 10/913,074 now U.S. Pat. No. 7,151,438, entitled "System and Wireless Device for Providing Real-Time Alerts in Response to Changes in Business Operational Data" (Hall et al.), filed Aug. 6, 2004, U.S. patent application Ser. No. 11/016,520, entitled "Orthogonal Drill Method for Navigating Across Multiple Hierarchical in a Multi-Dimensional Database" (Hall et al.), filed concomitantly herewith, and claims priority from:

U.S. Provisional Patent Application Ser. No. 60/599,472 entitled "Mobile Integration Engine for Accessing Data and Information in a Multi-Dimensional Database and Transforming the Data, Information and Relational Rules for Delivery to a Browser-Based Application" (Hall et al.), filed Aug. 6, 2004.

all of which are incorporated by reference herein and assigned to the assignee of the present application.

FIELD OF THE INVENTION

The present invention relates to business analytics and business intelligence services. More specifically, the present invention relates to application services platform for accessing data and information in a multi-dimensional database and transforming the data, information and relational rules into a markup language for ultimate delivery to a wireless device

BACKGROUND OF THE INVENTION

Historically, due to the uncertainty of certain industry-level business conditions, business entities have largely managed for short-term competitiveness. Competitive changes that have been instituted, such as cost-reduction and technology enhancements, have mostly resulted in incremental changes to the business entity rather than transformational changes.

In the last several years, in order to effect a long-term strategic and competitive vision, industry analysts have been advocating that business entities move towards the concept of a "real-time enterprise." Although given slightly varying definitions throughout industry, a real-time enterprise may be defined as an organization that leverages technology in order to reduce the time between when data is recorded in a system and when it is available for information processing. Essentially, a real-time enterprise strives to reduce the time taken for critical business processes by providing the relevant information to its decision-makers as soon as possible. Reducing the time that it takes for up-to-date critical business information to reach the decision-maker dramatically increases the effectiveness of the decision that he or she makes.

The importance of becoming a real-time enterprise may be applied across all industries. For example, in the banking industry, banks are liable for heavy fines and penalties if found to not to be in compliance with laws requiring minimum cash ratios. In order to evaluate and preclude non-compliance, the current state of financials and critical ratios should be available throughout the day for immediate notification and mediation of problems before they exceed regulatory tolerances. Similarly, in the airline industry, critical performance metrics such as airline operations, sales and marketing, and corporate financials must be assessed continuously. Critical operations that require immediate, actionable information might include response to flight incidents, mechanical failures and repair times, and route/reroute management required for bad weather and/or similar unexpected events. Likewise, in the health insurance industry, a major health event can result in a significant claim to the insurance provider. Immediate information about the associated cost and future impact of cash flow is an important part of the provider's risk management program.

While the benefits of becoming a real-time enterprise are readily understood, the demands on a business to move towards this real-time enterprise concept are tremendous. The forces of short-term competitiveness as well as the requirements under recent legislation such as the Sarbanes-Oxley legislation in the United States, which requires, inter alia, real-time reporting of events that affect a public company's financial situation as well as operational 'transparency,' and the similar Basel II law in Europe, Australia and Canada, are pushing both business and technology to maintain pace and adapt to exponential rates of change. Furthermore, the complexities of aligning the various functions, processes, and business units of a business entity, as well as the associated costs and business cultural, or institutionalized, thinking within the entity, may appear insurmountable. For example, referring back to the banking industry example, while having up-to-date information on the status of the minimum cash ratio balance for financial institution is crucial, the information is extremely dynamic and fluctuates daily in response to customer activities such as promotions and loan approvals, as well as in response to market swings and interest rate changes. In the health insurance industry example, claims for major health incidents consist of numerous and multiple filings by all of the various care providers (doctors, hospitals, anesthesia etc). These claims are received at different times over what can be an extended period of time, which militates against a real-time decision.

Another major obstacle to the real-time enterprise—and perhaps the largest obstacle—is the business entity's level of information technology readiness and the problem of the integration of all of the disparate data and information sources across all levels and functions of the enterprise.

Although solutions exist that endeavor to overcome these aforementioned obstacles, the combined dynamics of these changing business requirements and rapidly evolving technologies cause most solutions and applications to become obsolete soon after their implementation (and, in some instances, prior to their implementation).

In addition, while prior solutions recognize the need to provide to the executives, managers, and other decision-makers critical business metrics or key performance indicators (KPI) on a timely basis, such metrics by themselves do not necessarily provide to the decision-maker the proper viewpoint from which to evaluate the particular situation and make the most informed and effective decision.

SUMMARY OF THE INVENTION

Thus, there is a need to improve the timing and enhance the effectiveness of critical decision-making in a business enterprise.

There is also a need for providing real-time notification of critical operational data and business statistics affecting corporate performance to executives, managers and the mobile workforce of the business enterprise.

A further need exists for providing real-time alert notification of changes in critical operational data and business statistics affecting corporate performance to executives, managers and the mobile workforce of the business enterprise.

There is an additional need for a solution that is capable of providing business operational data and performance management, business intelligence information, and other focused operational activity measures that may be used to determine overall business efficiency in a dynamic, real-time, mobile environment to in order that a decision-maker can effectively evaluate and then act on this information in a timely manner.

There is a further need to provide this critical business information in the context of important historical, analytical, competitive analytics, trends, and performance objectives, the critical business information being selected by the business entity so that the action that the decision-maker makes is more informed and timely, and thus more effective.

An added need exists to provide this contextually-based real-time business operational data and business intelligence information over a platform-independent, services-oriented architecture (SOA) that will allow applications executing within the solution environment to be changed, modified, upgraded, enhanced or deleted without requiring change or replacement of the underlying solution infrastructure.

Finally, there is a need to provide this contextually-based real-time business operational data and business intelligence information over a platform-independent, services-oriented architecture (SOA) that will allow for the ready interchange of legacy software and applications within solution infrastructure.

In according with a first aspect of an embodiment of the invention, a system for providing current operational data and other business intelligence information of a business enterprise stored in at least one data source to a wireless device has an architecture comprising an enterprise application integration services component for accessing the current operational data and other business intelligence information of a business enterprise stored in the at least one data source and for conditioning the current operational data and other business intelligence information for the analytics services component; an analytics services component for extracting from the business intelligence information, a first set of critical business information, including at least one critical business metric related to the operational data and a second set of critical business information contextually-related to the operational data and the first set of critical business information, and for converting the operational data and the first and second sets of critical business information into a device-independent, web-enabled format; and, a delivery services component for recoding the formatted operational data and the first and second sets of critical business information in accordance with the data delivery protocol requirements of the wireless device, wherein the operational data will be displayed in the context of the first and second sets of critical business information.

In accordance with another aspect of an embodiment of the invention, the conditioned operational data and at least a first set of the other business intelligence information have a defined relationship, and wherein the analytics services component further comprises an analytics engine, including a multi-dimensional database, the analytics engine allowing for the modification of the conditioned operational data without affecting the defined relationship between the conditioned operational data and the at least a first set of other business intelligence information; and, a mobile integration engine application, including a custom data abstraction layer for accessing the multi-dimensional database of the analytics engine services component and converting the data elements and relational rules of the multi-dimensional database into a markup language customized for the wireless device.

In yet another aspect of an embodiment of the present invention, the mobile integration engine application further comprises: an orthogonal drill logic and database access component for reading and translating "drill-down" and "drill-across" rules of the multi-dimensional database and for identifying and authenticating the critical business information, including at least one critical business metric extracted from the analytics services component; a web application component for creating custom markup language code for the read and translated "drill-down" and "drill-across" rules of the multi-dimensional database, and for monitoring the orthogonal drill logic and database access component for event changes within the operational data critical business information, and communicating a dynamic alert to the delivery services means if an event change occurs; and, an administration application component for providing a secure interface between the analytics engine and personalization and authentication application services included in the enterprise data source and for controlling access to the operational data and first and second sets of critical business information.

In still another aspect of an embodiment of the present invention, a web-enabled wireless device is provided comprising a receiver means adapted to receive real-time operational data and business intelligence information from a business enterprise over a wireless communications network; and a mobile browser adapted to configure for display on a display of the wireless device, the received operational data and other business intelligence information, wherein the real-time operational data includes the current state of at least one critical business metric of at least one aspect of the business enterprise, and wherein the business intelligence information represents additional data that provides a business context for the at least one critical business metric.

In a further aspect of an embodiment of the present invention, the web-enabled wireless device is adapted to display the received operational data and other business intelligence information for the at least one critical business measure in at least one of a plurality of pages. In addition, at least one of the plurality of pages may include at least one user-actionable link to at least a second page, wherein the second page includes received operational data and other business intelligence information that is contextually-related to the at least one critical business measure. Further, at least one of the plurality of pages includes at least one user-actionable link to allow a user of the web-enabled wireless device to initiate communications over the wireless communications network to a predetermined contact.

Still other features and advantages of the present invention will become readily apparent to those skilled in the art from the following detailed description, wherein there is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF THE PREFERRED EMBODIMENTS

Preferred features of selected embodiments of this invention will now be described with reference to the figures. It will be appreciated that the spirit and scope of the invention is not limited to the embodiments selected for illustration. Also, it should be noted that the drawings are not rendered to any particular scale or proportion. Finally, it is contemplated that any of the configurations and materials described hereafter can be modified within the scope of this invention.

I. System Architecture

Figure 1:
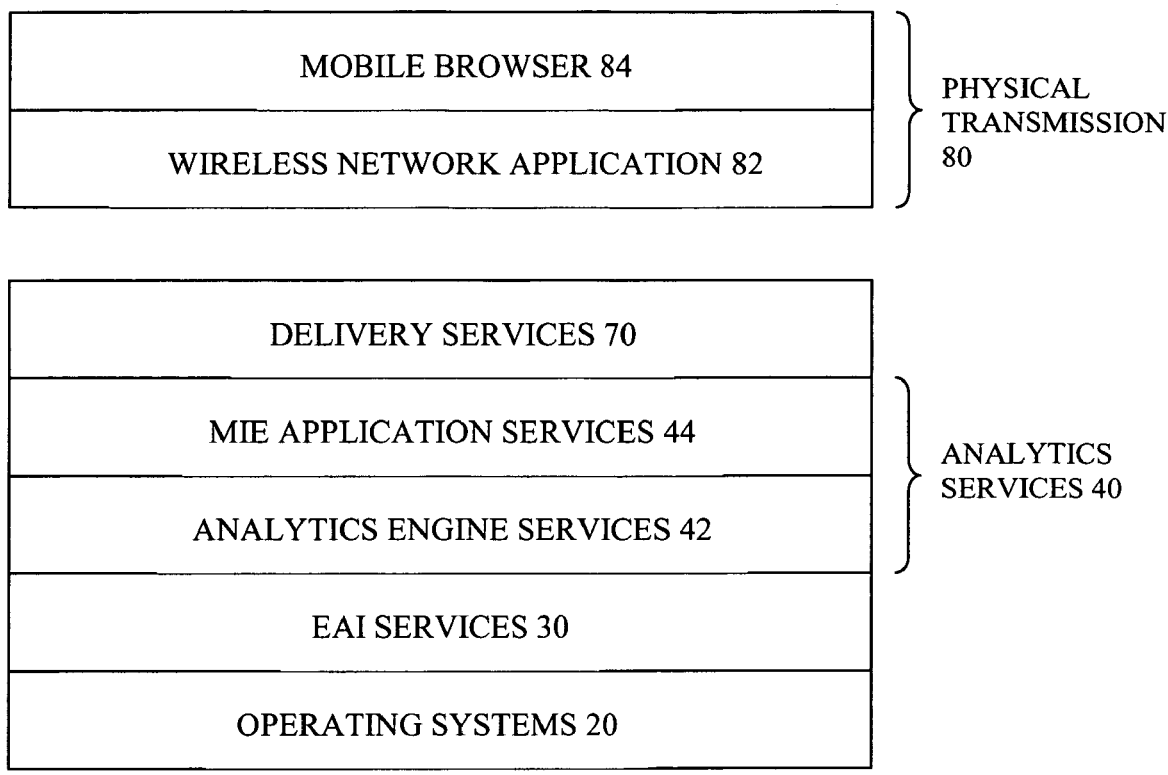
FIG. 1 is a high-level block diagram of the logical architecture for one embodiment of the solution of the present invention.

FIG. 1 sets forth the logical architecture 10 for one embodiment of the solution of the present invention. In a preferred embodiment of the present invention, the solution is the ExecuPoint$^{SM}$ solution commercially available from Unisys Corporation, Unisys Way, Blue Bell, Pa., 19424.

The framework of the solution of the present invention is designed around an n-, or multi-tier, client/server architecture where each of the tiers, or abstraction layers, is independent. As understood by those skilled in the art, an n-tier architecture is essentially an extension of a 3-tier client/server architecture—the three tiers generally agreed to comprise presentation, business logic or application ("business rules"), and data storage and data access. The tiers are generally developed and maintained as independent modules or components, and often on separate platforms. In one typical environment, the presentation layer implements the "look and feel" of an application. It is responsible for the presentation of data, receiving user events and controlling the user interface, such as a graphical user interface (GUI). The application layer may consist of one or more separate modules running on an application server or workstation server and serves to implement the business logic of the applications. The application component is often powered by a Java Application Server (e.g., WebLogic or WebSphere). Finally, the data storage and access layer is contained on a relational database management system (RDBMS), database server, and/or mainframe computer, and manages the persistence of application information. It is usually powered by a relational database server (e.g., Oracle® RDBMS or Microsoft's SQL Server). In the case of an n-tier architecture, the middle tier (i.e., the application layer) is multi-tiered itself. The client in the 3-tier or n-tier client/server architecture is sometimes referred to as "thin" client, because the bulk of processing occurs on the server side and thus the components in the presentation layer require much less code.

One of the intended purposes, and main benefits, of n-tier architecture is that it allows for any of the tiers to be modified, upgraded, or replaced independently—that is, without affecting the other tiers—as business requirements and technology changes. Thus, for example, as a component in the business layer can be accessed by any number of components in the presentation layer, any changes to business logic can be made in one place and be automatically inherited by all other components without having to duplicate the change in those other components.

As seen in FIG. 1, in one embodiment of the present invention, the solution comprises four independent tiers and an optional fifth tier. However, it will be appreciated by those skilled in the art that the designation of the number of tiers is relatively arbitrary and that the architecture of the solution of the present invention may have any number of tiers as long as it is consistent with the principles of an n-tier architecture as discussed above. That is each tier is fully encapsulated, and therefore there are no dependencies between any of the layers. In addition, each of these layers may be implemented in J2EE (Microsoft) or .Net (e.g., UNIX/Linux, etc.) architectures depending upon the preferred architecture of the business enterprise.

A. Operating Systems Layer 20

The bottom tier, or operating systems layer 20, is actually not part of the solution of the present invention but rather represents an enterprise's operational systems with which the solution operates, such as CRM and financial back office systems, and including web servers, custom/legacy applications and the numerous diverse data sources and stores spread throughout the enterprise. The diverse data sources may include multiple databases managed by a relational database management system (RDBMS). It is included here merely for clarity of understanding of understanding of the invention.

B. Enterprise Application Integration (EAI) Services Layer 30

The next tier, the enterprise application integration (EAI) services layer 30, is a layer that provides the connectivity between the aforementioned back-end data systems of operation systems layer 20 and the analytics engine 42 of the third tier, the analytics layer 40 (discussed in more detail below). EAI services layer 30 links all of the enterprise's applications, links all of enterprise's databases, and channels the enterprise data, which is typically stored in a variety of data sources throughout the enterprise, into a specific database for analysis. Most importantly, EAI services layer 30 "ties" all these aspects together so that they appear as one virtual, unified application.

Thus, EAI services layer 30 pulls together the appropriate information sources for operational, analytical and historical data necessary for the creation of critical business measures or key performance indicators (KPI) by the analytics engine 42. (As known to those skilled in the art, a Key Performance Indicator, or KPI, is a critical, unambiguous and quantifiable measurement of the performance of an enterprise, group, service, or subset thereof, and which is critical to the success of the enterprise).

Using business rules, data transformation rules, and object technologies, the EAI services layer 30 can be adapted to integrate new sources of information as the business adds/changes/removes various systems. This functionality is especially valuable to leverage information across systems (e.g., sales force automation software (SFA), financials & marketing, etc.), departments and across companies (partnerships, business-to-business operations (B2B), and acquisitions). In a preferred embodiment of the present solution EAI service layer 30 provides services through industry standard software and protocols, and in one embodiment of the present invention, EAI services layer 30 provides its services through the Turbo Integrator module of Applix's TM1 analytics server software product, commercially available from Applix, Inc., 289 Turnpike Road, Westborough, Mass. 01581. However, it will be appreciated by those skilled in the art that other solutions providing similar connectivity may be used instead; for example, EAI solutions products available from TIBCO Software, and SeeBeyond Technology Corporation. Other alternatives are available as will be understood by one skilled in the art.

The EAI services layer 30 includes a common application programming interface (API) to allow the MIE application services 44 of the solution of the present invention (discussed in more detail in the following paragraphs) to subscribe to any implementation thereof. EAI services layer 30 further includes a robust, rules-driven integration engine (not shown), which can also be integrated with or substituted by a number of commonly available EAI engines such as available in IBM Corporation's WebSphere and BEA's System Inc.'s WebLogic software solutions.

C. Analytics Services Layer 40

In a preferred embodiment of the present invention, the third tier, or analytics services layer 40, comprises two sub-tiers: analytics engine services layer 42 and mobile integration engine (MIE) application services 44.

As set forth above, the present solution provides the delivery of real-time operational data and information that is used to manage daily business operations (consistent with the defined workflow and processes of the business enterprise) to decision makers regardless of their location, and does this is a contextually-based environment. That is, the current operational data and state statistics of this data is compared and presented against history, trends, competitive analytics and/or objectives that are relevant to and aspect of the business enterprise i.e., some function, service or operation thereof. It was discovered that by ensuring that decision makers have the most current state of the business enterprise combined with traditional decision support analytics—including representations of the indications on the strength of that status and on its transitional state as the business enterprise moved against performance plans, competition and market fluctuations—more accurate and timely decisions would be possible. This could be seen, for example, when sales executives could easily track the current status of team and client performance versus specified target numbers, marketing executives could track product launch information compared against targeted expectations to identify campaign effectiveness, and customer service and operations managers could monitor trends in call volume and cross-channel utilization to more effectively manage resources. It will be understood for purposes of the present invention that "real-time" is defined to mean that output is generated nearly simultaneously with the corresponding inputs.

The analytics engine services layer 42 and mobile integration engine application services 44 of the solution of the present invention are core to providing this feature. Further information on the MIE application services 44 is included in Appendix A, hereto.

1. Analytics Engine Services Layer 42

Analytics engine services layer 42 may be viewed as a multi-dimensional data mart, in that this services layer both extracts essential information from the numerous and diverse data sources and stores spread throughout the enterprise based on integrated data rules definitions, and further acts as a single, consolidated point for gathering and manipulating data from these different sources and stores. Analytics engine services layer 42 is a "data cube"—i.e., a collection of one or more tables of data, assembled in a fashion that allows for dynamic analysis through indexing to be conducted on the joins, intersections, and overall integration of these predefined tables. By way of background, and as known to those skilled in the art, a "data cube" or "cube" is a highly indexed data construction comprising a logical organization of multi-dimensional data, where the side represents a business dimension, edges of the cube contain dimension members, and the body of the cube contains measure values related to the dimension and dimension members. The indexing technique used to navigate the "cube" creates a series of logical "hierarchies," and the process of navigating up and down through the levels in a hierarchy from one item to a set of related items is referred to as "drilling." As further understood by those skilled in the art, "drill down" generally refers to an analytical technique that queries data from a summary row and navigates through a hierarchy of data to reach the detail-level rows; "drill up" refers to an analytical technique that navigates from detail to header rows of data used to view summarized or aggregated data. "Drill across," as used herein, is a novel feature of the present invention and will be described in more detail in the forthcoming paragraphs.

Analytics engine services layer 42 includes a dynamic, multi-dimensional database that supports analytics, traditional drill-paths, and enhanced functionality to enable information updates and changes without rebuilding the database environment. This functionality enables operational data to be continuously updated while preserving the relationship between current data updates and historical trends and analytics. In one embodiment of the present invention, analytics engine services layer 42 provides its functionality through the Integra module of Applix's TM1 analytics server software product. However, it will be appreciated by those skilled in the art that similar solutions may be substituted. This may be important, for example, if an enterprise desires to preserve the value of its prior investments. Alternatives that may be used include, but are not limited to, similar applications from Oracle®, Cognos Inc., Business Objects SA, Hyperion Solutions Corporation and MicroStrategies. Other alternatives are available as will be understood by one skilled in the art.

2. Mobile Integration Engine (MIE) Application Services 44

Based on the concepts of rules-driven, object-oriented middleware applications, mobile integration engine (MIE) application services 44 is an adaptable middleware component built to access the data and information stored in an enterprise's multi-dimensional databases via the analytics engine services layer 42, and then transform it into a variety of industry standard data formats common in message-oriented, web-enabled environments so that the data can be delivered to the end mobile device by the deliver services layer 70 (discussed in more detail in the forthcoming paragraphs). Although a layer within the solution of the present invention, it may also function as a standalone (i.e., not connected with delivery services layer 70), web-based, application, enabling the delivery of data from multi-dimensional databases and analytics engine services layer 42 to browser-based presentation applications.

The MIE business rules of the MIE application services 44 access the database(s) via a standard API (not shown), abstracting (i.e., wrappering/translating) the custom data interfaces of any multi-dimensional data store in order to provide the novel orthogonal drill behavior of the solution of the present invention (described in more detail below). This then manages how the drill path is navigated, which drill path is selected, current operational state information, and the eventual production of the markup language text (e.g., HTML or XML) describing both the data elements as well as relational rules (how these elements relate to be properly presented). As the functionality provided by the MIE application services 44 includes aspects of portal and personalization and is well suited for the limited screen real estate common to mobile device application, it is also a viable solution for interfacing to more traditional PC-based browsers.

Figure 2:
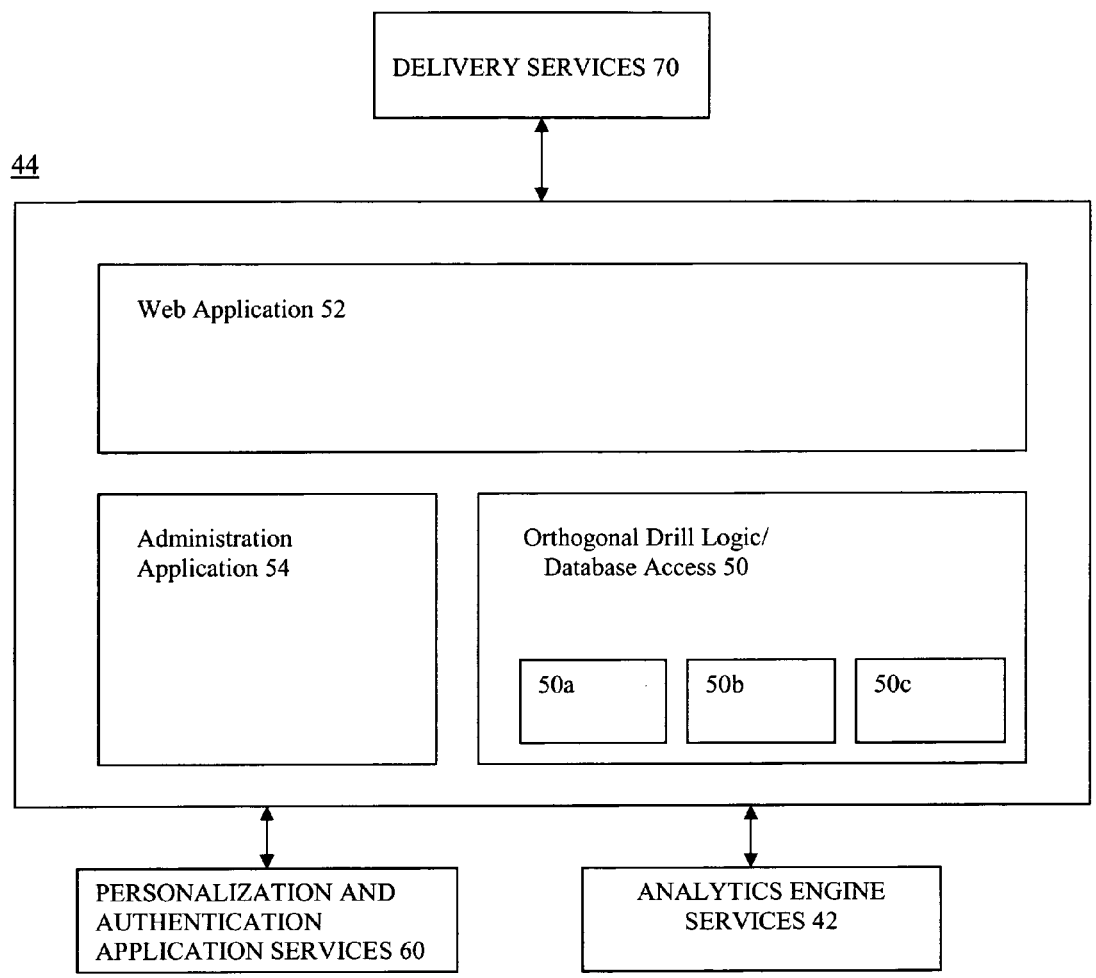
FIG. 2 is a block diagram of the logical architecture for one embodiment of the mobile integration engine application services tier of the solution of present invention.

FIG. 2 shows the logical architecture for one embodiment of the MIE application services tier 44 of the solution of present invention. In this embodiment, it comprises three main components: orthogonal drill mechanism component 50; web application component 52, and administration application component 54.

a. Orthogonal Drill Logic and Database Access Component 50

The orthogonal drill logic and database access component 50 is a middleware component that provides an innovative orthogonal drill mechanism particularly optimized for mobile applications. As used herein, "orthogonality" is similar to the use of the term in linear algebra, as will be appreciated from the forthcoming discussion. The orthogonal drill logic and database access component 50 and its associated orthogonal drill mechanism include the ability to read and translate the informational 'drill-down' and 'drill-across' rules as defined within a multi-dimensional database. Again, "drill down" is the process of retrieving progressively detailed data relative to a particular dimension by expanding a parent member to reveal its children. Details of the orthogonal drill mechanism of the present invention that allows for the novel "drill across" functionality of the present invention are set forth in the following paragraphs and may be understood with particular reference to FIGS. 18-22 (discussed below).

In prior systems, navigation of multi-dimensional databases has been geared towards analysis—that is, the emphasis has been on giving the database application's user as much information as possible either through a denormalized, nested spreadsheet (e.g., Applix's TM1 analytics server software product) or through a cross-tabbed matrix (e.g., Analytic Modules commercially available from MicroStrategy, Inc.), which chooses a particular "driver" dimension to drill by, while the other dimensions remain set or static for a desired metric. According to one embodiment of the preferred solution of the present invention, the orthogonal drilling mechanism "unwinds" the nested dimensions and provides those critical business metrics that are based upon the possible choices related to a particular cell (i.e., the "vertex" of all specific dimensional information for a single given metric) rather than all information related to all dimensions at a particular level (analysis view). It is important to note that the term "vertex" herein is also used in a manner similar to the use of that term in linear algebra; that is, to indicate the point where all drilled dimensions cross. Thus, it is the intersection of associated metrics for all drilled dimensions along a drill path.

Figure 18:
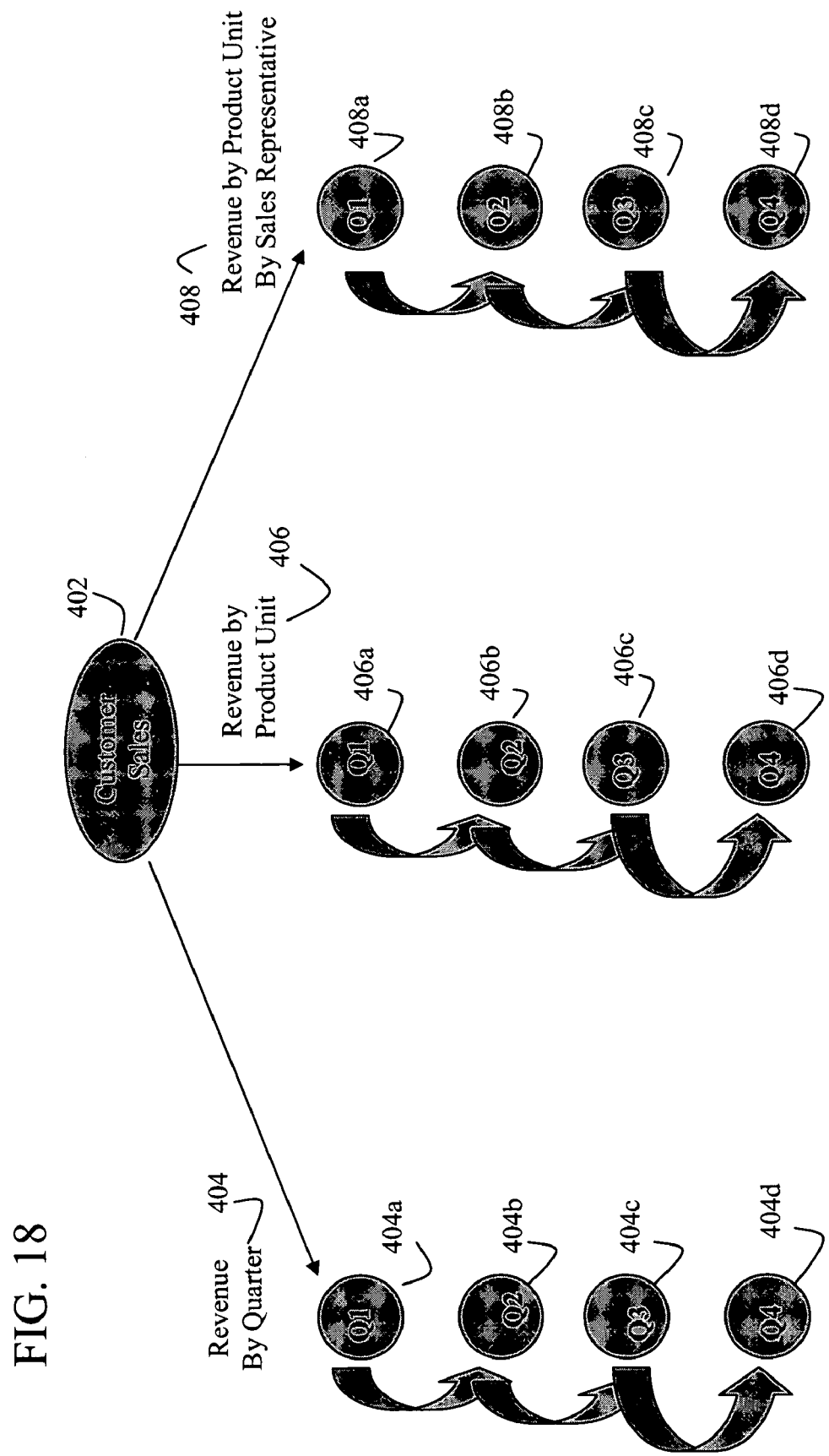
FIG. 18 is a two-dimensional diagram representing a known drill path used to navigate a multi-dimensional database.

By way of example, and with reference to FIG. 18, in prior systems, a database user of a multi-dimensional database (not shown) might desire to view information relating to a critical business metric, such as sales of various products. Starting from a "Customer Sales" critical business metric 402, a user could thus "drill" down into any selected one of the dimensions associated with the "Customer Sales" critical business metric 402, which might include the following dimensions, for example: Total Revenue by Quarter 404, Total Revenue by Product Unit 406 and Total Product Sales by Sales Representative 408. From that point, the user could "drill" up and down among the child levels representing measures of the selected dimension. Thus, if the user selected Total Revenue by Quarter 404, she could continue to navigate among its child levels 404*a*-404*d*.

While this traditional drill mechanism is useful in that it provides to the user as much data as possible by providing an exhaustive exploration of all data points, it does not allow a user to readily access other dimensions associated with the measure reflected by the current child level of the current dimension while still maintaining the relationship of the data across these levels. Using the above example, once the user has selected the Q2 level in Total Revenue by Quarter 404, the traditional drill mechanism does not readily allow the user to then access information for this quarter (i.e., Q2) from the Total Revenue by Product Unit 406 dimension or the Total Product Sales by Sales Representative 408 dimension without drilling back up to the "Customer Sales" critical business metric 402, and then drilling back down into the Total Revenue by Product Unit 406 dimension or the Total Product Sales by Sales Representative 408 dimension.

Figure 19:
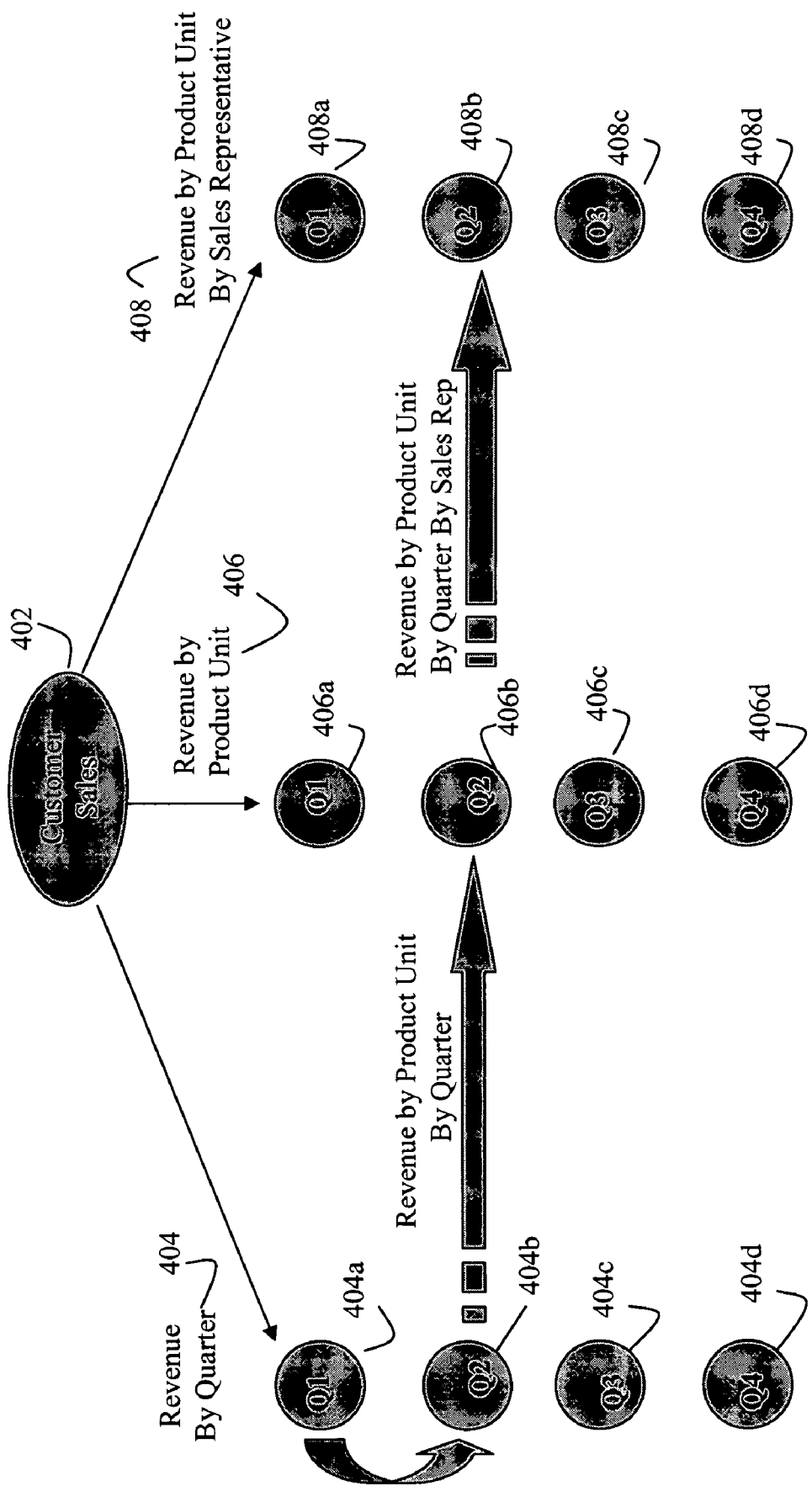
FIG. 19 is a two-dimensional diagram representing a general exemplary orthogonal drill path created by the orthogonal drill mechanism of one embodiment of the orthogonal drill logic and database access component of the present invention; and, FIGS. 20-22 represent two-dimensional diagrams and sample graphical displays showing additional exemplary orthogonal drill paths created by the orthogonal drill mechanism of one embodiment of the orthogonal drill logic and database access component of the present invention.

The drill mechanism of the orthogonal drill logic and database access component 50 of the present invention resolves this problem. With reference to FIG. 19, if the aforementioned user again selected the Total Revenue by Quarter 404 dimension, she may view any of the Total Revenue by Quarter 404 child levels 404*a*-404*d*, as with the traditional drill path mechanism. However, the drill mechanism of the orthogonal drill logic and database access component 50 of the present invention additionally allows the user to "drill across" to other "Customer Sales" dimensions having related measures. For example, if a user is reviewing the Q2 data under the Total Revenue by Quarter 404 dimension, she may find an anomaly within that data and want to investigate further; for example, to determine to which product division the anomaly is attributed. The drill mechanism of the orthogonal drill logic and database access component 50 of the present invention allows the user to "drill across" from Q2 404*b* to Q2 406*b*. When the "drill across" occurs, the user will see the root of the Total Revenue by Product Unit 406 dimension, and she may then drill through all product unit child levels constrained only by the previous selections of revenue and quarter (in this example, Q2). Furthermore, as these child levels are represented as individual pages containing critical business metric summaries derived along the drill path, and as each prior child level may be persistent, a bread crumb-like path is built to allow a user to navigate back and forth between the current and any prior "drilled" level. Thus, in this example, the user may navigate back and forth between the two child levels of the related "Customer Sales" dimensions—in this example, between Total Revenue by Quarter 404 and Total Revenue by Product Unit 406.

Similarly, if the user wants additional information such as the allocation of these product sales by sales representative, the drill mechanism of the orthogonal drill logic and database access component 50 allows her to "drill across" from Q2 406*b* to Q2 408*b*. Again, the user begins at the root of the sales representative hierarchy. As the user drills through to the Total Product Sales by Sales Representative 408 dimension, the measures are constrained only by the previous selections—in this case by the selected revenue and quarter and the product unit measure from which the drill-across occurred. Furthermore, as the bread crumb-like path left by the drilling mechanism allows the user to navigate back and forth between the current and any prior "drilled" level, the user may navigate back and forth between the three child levels of the related "Customer Sales" dimensions—Total Revenue by Quarter 404, Total Revenue by Product Unit 406, and Total Product Sales by Sales Representative 408.

Figure 20:
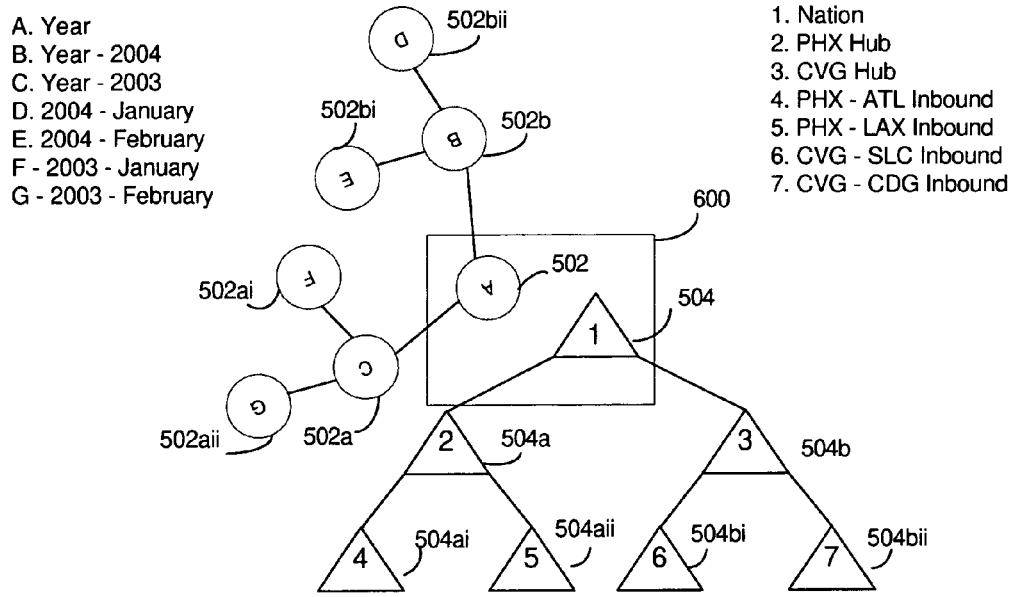
Figure 20:
Figure 21:
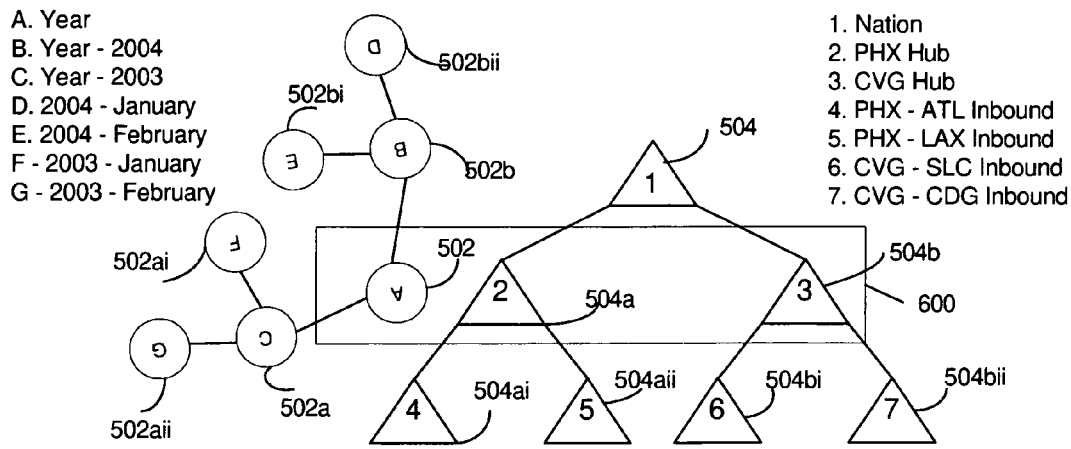
Figure 21:
Figure 21:
Figure 22:
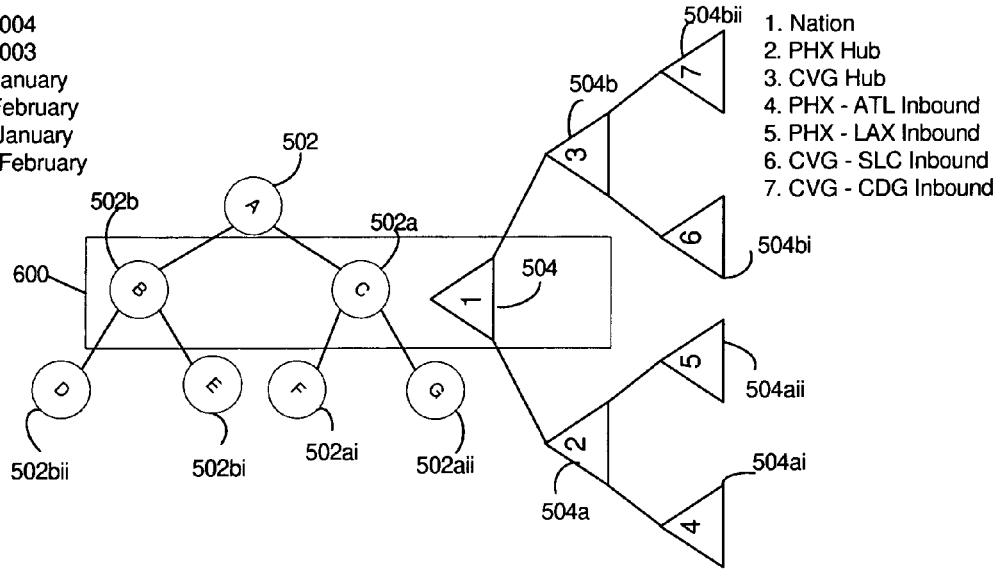

Referring to FIGS. 20-22, more specific illustrations of the operation of the drill mechanism of the orthogonal drill logic and database access component 50 are shown in conjunction with the Execupoint$^{SM}$ solution from Unisys Corporation. (Reference to FIGS. 4-16 and the accompanying discussion will also be helpful). As seen therein, one example of a critical business metric, or KPI, that might be relevant to an airline industry user, for example, is mishandled baggage 500. The dimensions of mishandled baggage 500 might include the Year 502 and Nation 504, which in turn might have measure child levels of specific years 502*a* and 502*b* (e.g., years 2003 and 2004) and 504*a* and 504*b* (e.g., Phoenix Sky Harbor International (PHX) Hub and Cincinnati/Northern Kentucky International (CVG) Hub), respectively. Child levels 502*a* and 502*b* might, in turn, further include child levels 502*ai* and 502*aii*, and 502*bi* and 502*bii*, respectively. These levels might represent the measures of months in their respective parent level year (e.g., January 2003, February 2003, January 2004, and February 2004). Similarly, child levels 504*a* and 504*b* might further include child levels 504*ai* and 504*aii*, and 504*bi* and 504*bii*, respectively. These levels might represent the originating airport of the flight into the hub of their respective parent level (e.g., Atlanta-originating flights inbound to PHX, Los Angeles-originating flights inbound to PHX, Salt Lake City-originating flights inbound to CVG, and Charles De Gaulle-originating flights inbound to CVG).

Thus, if the user wanted to determine information about mishandled baggage, she would drill down to the mishandled baggage critical business metric 500. As set forth above, mishandled baggage 500 might include dimensions Year 502 and Nation 504. If the user wanted to determine additional information about mishandled baggage, for example specifics measures regarding mishandled baggage 500 by airport, the drill mechanism of the orthogonal drill logic and database access component 50 would allow the user to drill down to the Nation dimension 504 (FIG. 21). At this level, could navigate further to child levels 504*ai*, 504*aii*, 504*bi* and 504*bii* (e.g., for specific airport-related information). (Dotted rectangle 600 corresponds to the levels that are displayed or otherwise presented to the user from which she can drill.)

If, after the drilling down to the Nation dimension 504, the user did not want specific airport-related information (child levels 504*ai*, 504*aii*, 504*bi* and 504*bii*), but instead wanted to determine further information about mishandled baggage 500 by year, the drill mechanism of the orthogonal drill logic and database access component 50 would allow the user to drill across to related measures in the Year dimension 502 (FIG. 22).

Other than available resources (e.g., constraints inherent within the hosting environment), there are no restrictions on the number of dimensions that may exist. However, the orthogonal drilling mechanism described above requires that the dimensions of the critical business measures be independent of one another. In addition, because the drilling mechanism is "orthogonal," once the drill path drills across to a child level in another related dimension, it cannot return to another child level of the original dimension from which the drill path originated—i.e., the drill across path is acyclic.

It will be appreciated that due to the limitations of a two-dimensional graph, the navigational features of the drill mechanism of the orthogonal drill logic and database access component 50 cannot be fully realized when used in conjunction with a multi-dimensional database, and the above is merely exemplary of its function. For example, it will be appreciated that in a multi-dimensional database the user could also "drill across" directly from Q2 404*b* to Q2 408*b*, or any other similar permutation of "drill across." Similarly, the number of dimensions, levels, and subsequent child levels is not limited to those reflected in the Figures.

Thus, the orthogonal drill logic and database access component 50 provides the functionality for drilling down into an enterprise data source from the root of the primary critical business metric or KPI through an acyclic child structure and further provides for orthogonal drilling of an arbitrary number of dimensions while maintaining a persistent record of the vertex of the current drill path, even if multiple dimensions are crossed. (If a drilling dimension has no other metrics associated with it, orthogonal drilling will not be available). Finally, orthogonal drill logic and database access component 50 provides the functionality of allowing for the walking backwards along a current drill path.

In one embodiment of the preferred solution of the present invention, the metadata describing the cube structure must be entered via a personalization and authentication application services 60 when creating a critical business metric definition. When a user drills down through a dimension hierarchy, the Controller Component of web application component 52 (discussed in more detail below) checks the personalization and authentication application services 60 to see if there is any other dimension associated with the current measure. If there is, then the Controller Component applies the associated metadata to construct an HTML link on the display of the wireless device 342 allowing the user of the wireless device 342 to link to that metric for that dimension level. Application of this novel feature will be discussed further with reference to FIGS. 4-16.

In addition to the innovative orthogonal drill mechanism described above, orthogonal drill logic and database access component 50 provides a secure interface for identifying and authenticating the critical business data and KPI from the analytics engine services layer 42 to the MIE application services 44, and interfaces to that layer 42 through at least one of several sub-components (discussed in more detail below). In addition, component 50 provides secure identification of each individual KPI that is communicated from the analytics engine services layer 42, querying personalization and authentication application services 60 to determine whether the user of wireless device 342 is within a defined group or profile of users who have authority to access that critical business metric. (The operation of querying personalization and authentication application services 60 is described in more detail below).

In one embodiment of the solution of the present invention, the orthogonal drill logic and database access component 50 is implemented using Java Factory and Data Access Object design patterns to create a simple, abstracted API, and comprises the following three sub-components, the selection of which, it will be understood those skilled in the art, is dependent upon the API presented to it by the analytics engine layer 44, for example: a Java-Call Interface component 50a for interacting with multi-dimensional data structures; a Java Database Connectivity (JDBC) component 50b for allowing Java programs to interact with any SQL-compliant database, and a Java Message Service (JMS) Interface component 50c for supporting enterprise messaging systems such as those based on ARM-based processors.

b. Web Application Component 52

The web application component 52 provides various functionalities in the solution of the present invention. First, once the orthogonal drill logic and database access component 50 reads and translates the informational 'drill-down' and 'drill-across' rules, web application component 52 creates custom HTML or XML code defined for the particular mobile device's application, describing the metrics at each level of each group of indicators for every vertex in multi-dimensional drill path. Web application component 52 "stops" or "halts" the orthogonal drill at the vertex for the aforementioned metric consolidation while the drill continues along a new dimensional path. Finally, it prevents confusion by disallowing the recurrent multi-dimensional cycles within a single path, as discussed above.

Web application component 52 also monitors event changes within the operational data and critical business and KPI data that is received from the orthogonal drill mechanism component and database access component 50, and then acts accordingly, pushing dynamic alerts and messaging based on these event changes. That is, if there is an event change in orthogonal drill mechanism component and database access component 50, web application component 52 will "push" an custom HTML or XML coded alert to the delivery services layer 70 via an HTTP Post. A markup may be also be pushed via an HTTP Post to delivery services layer 70 even where the wireless device 342 has not requested it. The pushed data will be stored preferably in the wireless device 342 cache (not shown), where it may be viewed at any time. This is particularly useful where the user of the wireless device 342 is not, or cannot, connect to the wireless network 82. In a preferred embodiment of the present invention, web application component 52 supports Web Services for Remote Portlets (WSRP) portal server integration.

Figure 3:
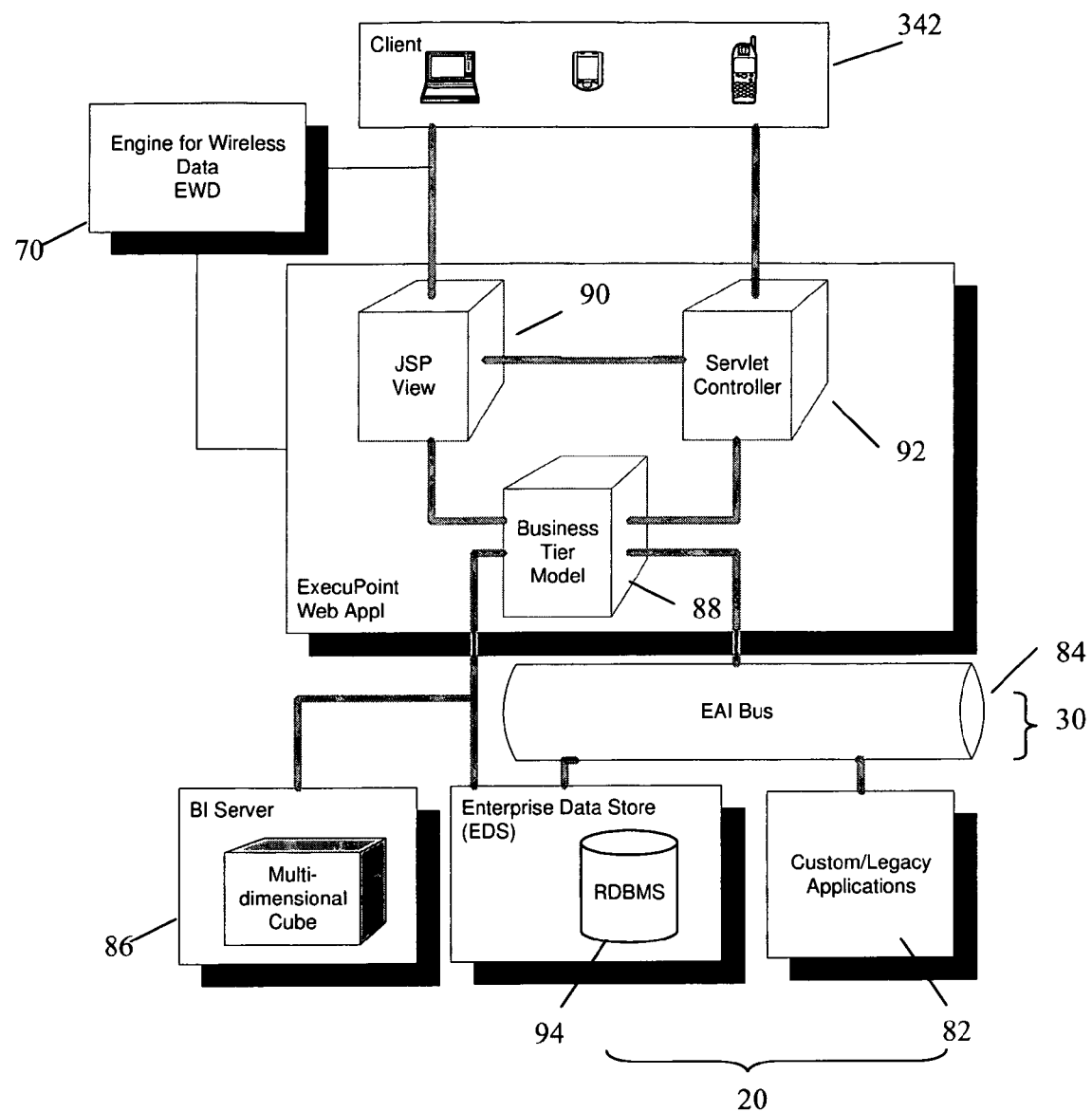
FIG. 3 is a high-level, application architecture diagram showing the components of the tiers of one embodiment of the solution of the present invention and the functional relationship between these components and layers.

Web application component 52 is preferably compliant with the Model-View-Controller (MVC) paradigm (see also, FIG. 3). Thus, the components act in accordance with its generally known principles. More specifically, the "Model Component" (e.g., Business Tier Module 88) includes the business process logic, business data entities, business rules that govern access to and updates of data, and defines the interfaces for business data entities. It responds to state queries from the "View Component" (discussed below) and notifies the "View Component" of changes in data.

The "View Component," (e.g., Java Server Page (JSP) View Module 90), which renders the content of the "Model Component" (Business Tier Module 88 in FIG. 3), is responsible for specifying how data should be presented and for generating the pages displayed on the mobile, portable devices. These pages use a combination of text, hyperlinks, icons and graphics to convey the information. It is also the "View Component's" responsibility to maintain consistency in its presentation when the "Model Component" changes. In one embodiment of the solution of the present invention, as described above, this is achieved by using a "push" model, where the "View Component" registers itself with the "Model Component" for change notifications. Alternatively, a "pull" model may be used, where the "View Component" is responsible for calling the "Model Component" when it needs to retrieve the most current data.

There are two main categories of pages generated by the View Component: measures and alerts. Measure pages display the descriptive information concerning the drill path, the current dimensional vertex, and related summary information. Additional elements, such trending graphs and basic application navigation links are present as well. Alerts comprise messages that are triggered to the delivery services layer 70 based on thresholds established in the data repository. Alert pages display detailed information concerning critical events related to the summary data on the Measure pages. They also provide a set of mechanisms enabling an active response to an alert. Email and portal links are available, with phone call response provided for devices supporting voice communications. Additionally, the Measure pages contain graphics indicating which measures have alerts associated with them. These will be discussed in more detail in the forthcoming paragraphs with regard to FIGS. 4-14.

Finally, there is the "Controller Component" (e.g., Java Servlet Controller Module 92). In accordance with the MVC paradigm, the "Controller Component" controls user interaction flow for the solution of the present invention. This component translates interactions with the "View Component" into actions to be performed by the "Model Component." In one embodiment of the solution of the present invention, where the MIE application services 44 comprises one of the tiers, or layers, they preferably appear as "GET" and "POST HTTP" requests. In the case where MIE application services 44 is a stand-alone application, user interactions could be button clicks or menu selections. Based on the user interactions and the outcome of the "Model Component" actions, the "Controller Component" responds by selecting an appropriate view from the "View Component."

c. Administration Application Component 54

The administration application component 54 provides the critical business metric definitions to the web application component 52, and provides a secure interface between the analytics engine services layer 42 and the enterprise's personalization and authentication application services 60 (which is typically part of an enterprise's underlying operational systems). The personalization and authentication application services 60 provides several functions. It manages the critical business metric information including information about the critical business metric and the alert threshold. Further, personalization and authentication application services 60 provides administration and access level security for determining who would be authorized to access which critical business metrics and who would be alerted for a change in the current operation status of these critical business metric. Thus, for example, personalization and authentication application services 60 manages the creation or deletion of a user and assignation of a user to a particular group and/or groups. A person having administrative rights to the personalization and authentication application services 60 can assign a critical business metric to a user or a group. If the critical business metric is assigned to a user, only that user can access that critical business metric. However, in certain instances, for example where a number of users are to be allowed access to a critical business metric, the administrator can assign the critical business metric to a group in order to simplify security access. In addition, the security for profile and login may be made via any of several directory services for accessing information directories, such as e-mail and public encryption keys. For example, interface 54 supports the Lightweight Directory Access Protocol (LDAP) directory service, Microsoft's Active Directory directory service (for the Windows® 2000 operating system and any customer database-driven profile management system (e.g., Microsoft's SQL Server Database or systems available from Oracle Corporation).

It will be appreciated that the MIE application services 44 is unique as a middleware component in that it is able to read and translate both the information and the related business rules maintained in a traditional 'data mart' (multi-dimensional database). This is a significant advancement over standard data translation tools represented in the market, generally known as Extract, Transformation & Load (ETL) tools. The ability to read data and the rules governing that data enables the full separation of the information and presentation tiers. This provides new dimensions in architectural flexibility not previously possible in traditional data mart and data mining solutions. MIE application services 44 is commercially available from Unisys Corporation at the address set forth above.

D. Delivery Services Layer 70

Referring again to FIG. 1, the fourth tier, the delivery services layer 70, is a middleware component that create and manages mobile devices' custom browsers and their related functionality. This layer thus allows an enterprise to elect to support more than one type of wireless device, such as a combination of a Blackberry® handheld device and PalmOS-based wireless PDA/cell phone. Delivery services layer 70 also provides transcode rendering support, by taking the device-independent markup language output from the mobile integration engine (MIE) application services 44 and re-rendering it into wireless markup language (WML), and further transmitting the data in accordance with the requirements of the target mobile device as to how the data should be delivered. In one embodiment of the present invention, delivery services layer 70 provides its services through Novarra Inc.'s Engines for Wireless Data (EWD) Product Suite, commercially available from Novarra Incorporated, Suite 500E, One Pierce Place, Itasca, Ill. 60143. However, the delivery services layer 70 of the solution of the present invention is not so limited, and other product solutions that provide the same functionality may be substituted. For example, any similar transcode renderer that can provide additional markup translation services beyond HTML may be used, such as those that can reformat HTML elements (e.g. tables) or produce other markup (e.g. WAP) optimized for a specific mobile device's screen real estate or compensate for a wireless device's lack of support for standard web application services such as JavaScript.

E. Physical Transmission Tier 80

Physical transmission tier 80 is an optional layer that may be incorporated into an embodiment of the solution of the present invention for those business entities that do not have any form of mobile enterprise. This tier 80 preferably includes two sub-tiers: the wireless network application component 82, which includes the wireless network, and a mobile browser component 84, which resides on the wireless device 342.

II. Functional Diagram

FIG. 3 is a high-level, application architecture diagram showing the components of the services layers of a J2EE embodiment of the solution of the present invention and the functional relationship between these components and layers. Operating systems layer 20 preferably comprises data storage for the enterprise, such as an RDBMS 90, and also custom and legacy applications 82. EAI services layer 30 preferably includes an EAI bus 84. Analytics services layer 40 preferably resides is a data warehouse (i.e., a central repository for all or significant parts of the data that an enterprise's various business systems collect) that preferably is modeled on a multi-dimensional cube. It resides on one or more business intelligence servers 86.

As discussed above, the web application component 52 of MIE application services tier 44 is preferably designed around the MVC paradigm and includes three components: a Business Tier Module 88 ("Model Component") that includes the business process logic, business data entities and defines the interfaces for business data entities; a Java Server Page (JSP) View Module 90 ("View Component"), which is responsible for generating the pages displayed on the mobile, portable devices; and the Servlet Controller Module 92 ("Controller Component") for controlling user interaction flow. It will be appreciated that, although a J2EE embodiment is shown in FIG. 3, the solution of the present invention encompasses similar environments. For example, a NET embodiment is similar to that shown in FIG. 3, with the JSP View Module being replaced by an Active Server Pages (ASP) View Module.

III. Portable Mobile Device

In one embodiment of the present invention, the business operational data and other business intelligence information is communicated from the physical transmission tier 80 of the solution to a web-enabled, mobile device 342. In that embodiment, mobile device 342 comprises a portable or hand-held device such as a Palm-Pilot, BlackBerry® handheld, Pocket PC, device running on the Java 2 Platform, Micro Edition (J2ME) platform, or any other similar personal digital assistant (PDA), mobile/cellular phone, laptop, notebook or any other similar portable device that is, or is adaptable to become, web-enabled.

Figure 4:
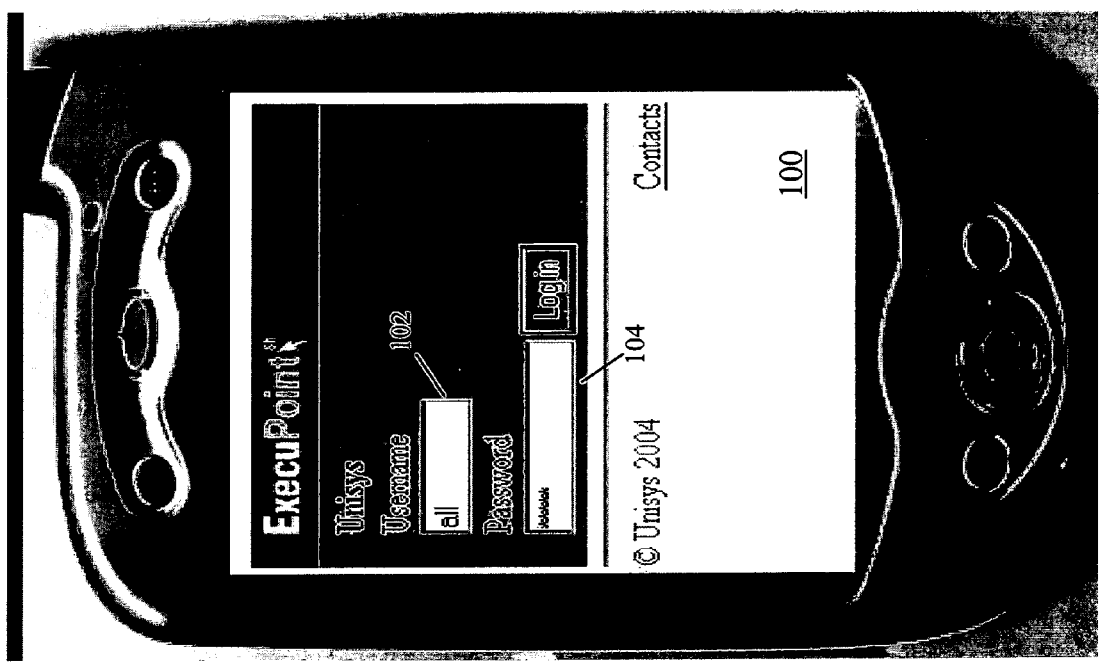
FIG. 4 illustrates a sample log-in screen displayed on a portable device that may be used in conjunction with the solution of the present invention.
Figure 5:
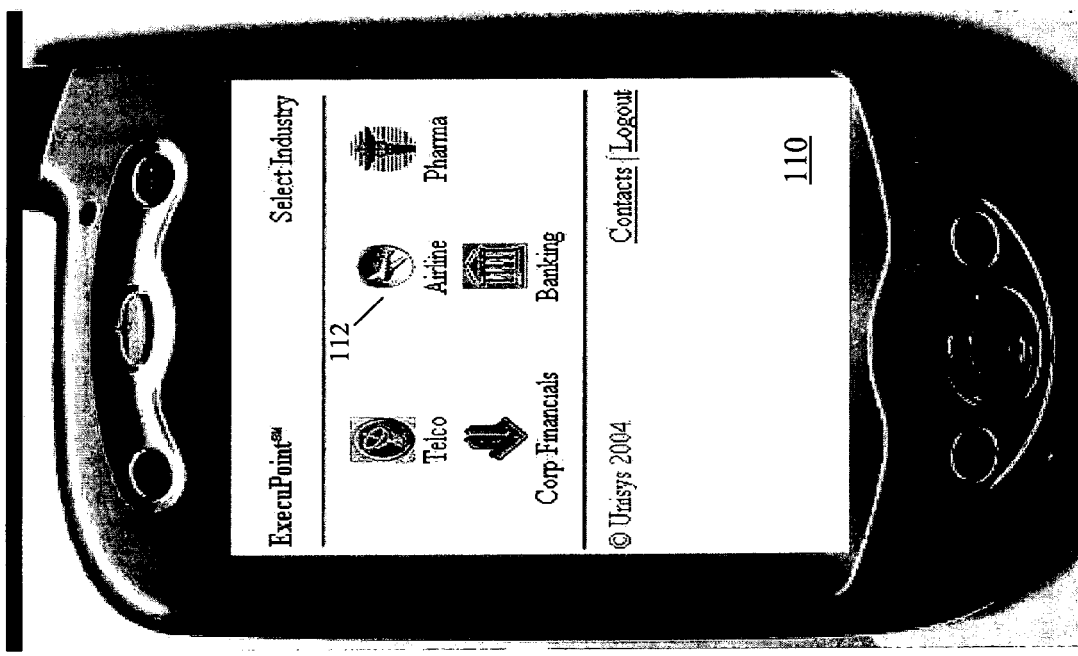
FIG. 5 illustrates a sample industry selection screen displayed on a portable device that may be used in conjunction with the solution of the present invention.

FIG. 4 shows a sample login screen 100 displayed on a portable device that may be used in conjunction with the solution of the present invention. From this screen a user would enter username 102 and password 104 which would be communicated back to the administration application component 54 of MIE application services 44 for authentication. In addition, as discussed above, application component 54 provides controls access and personalization and thus automatically communicates to the end user only those critical business metrics, or KPI, relevant to the decision-maker's level of access and authority as well as desire need.

Once the user is authenticated, the browser in mobile device 342 displays an industry selection screen 110 (FIG. 5), which preferably comprises a number of icons including hyperlinks to informational screens relating to the selected industry. For ease of understanding the present invention, the following discussion will be limited to the airline industry and its critical business metrics, or KPI. It will of course be understood that the present invention is not so limited and that the solution of the present invention is application to each and any other industry (including, but not limited to, manufacturing, banking, pharmaceutical, health insurance, government, wired and wireless telecommunications, etc.) and/or corporate division; unit, role, or function within a business enterprise (including, but not limited to, corporate financials, Sarbanes-Oxley, etc.) Furthermore, the display screens shown herein and discussed below are merely examples. Although in one embodiment of the present invention, the portable or hand-held device is a Palm-Pilot, BlackBerry® handheld or Pocket PC, it will be appreciated that different form factors, operating systems, browser applications and graphical user interfaces (GUI) may be used without departing from the scope and spirit of the invention.

Figure 6:
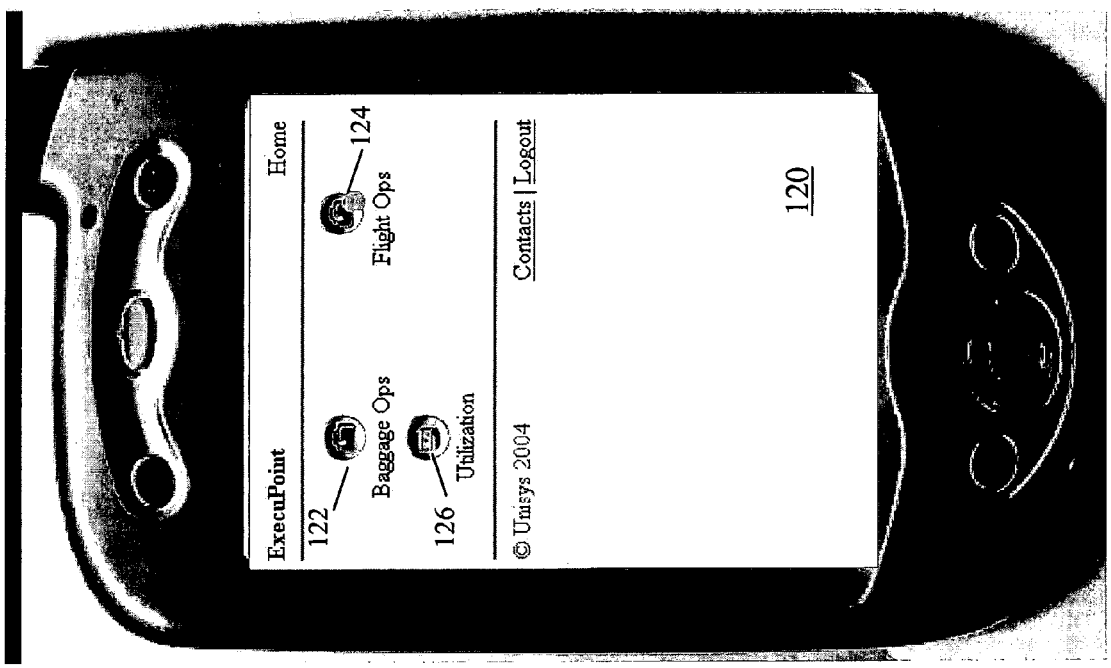
FIG. 6 illustrates a sample industry home screen including critical metric, or KPI, categories displayed on a portable device that may be used in conjunction with the solution of the present invention.

After selecting the airline industry icon 112 from industry selection screen 110, the industry home screen 120 will be displayed (FIG. 6). Industry home screen 120 displays the critical metric, or KPI, categories for a particular industry that have been previously selected and defined by the business enterprise. As shown in FIG. 6, critical metric, or KPI, categories for a business enterprise in the airline industry might include to baggage operations 122, flight operations 124 and utilization 126. Of course, these categories are merely exemplary of KPI categories, and these categories might be relabeled, modified, eliminated or appended to, depending on the particular business enterprise.

If the mobile device user were to select the flight operations icon 124, for example, he/she would be hyperlinked to a screen that would show all of the dimensions related to flight operations (screen not shown) As used herein, a "dimension" means a side of a multi-dimensional cube. Each dimension represents a different category that the business enterprise chooses to measure, such as customer, region, product, and time. One of the dimensions for the flight operations category might be "Nation," which might show the number of on-time departures for the airline at all of its hubs throughout the United States. If the user were to select the "Nation" link, in one embodiment of the present invention, the "Nation" dimension screen 130 of in FIG. 7 would be displayed on the mobile device 342.

Figure 7:
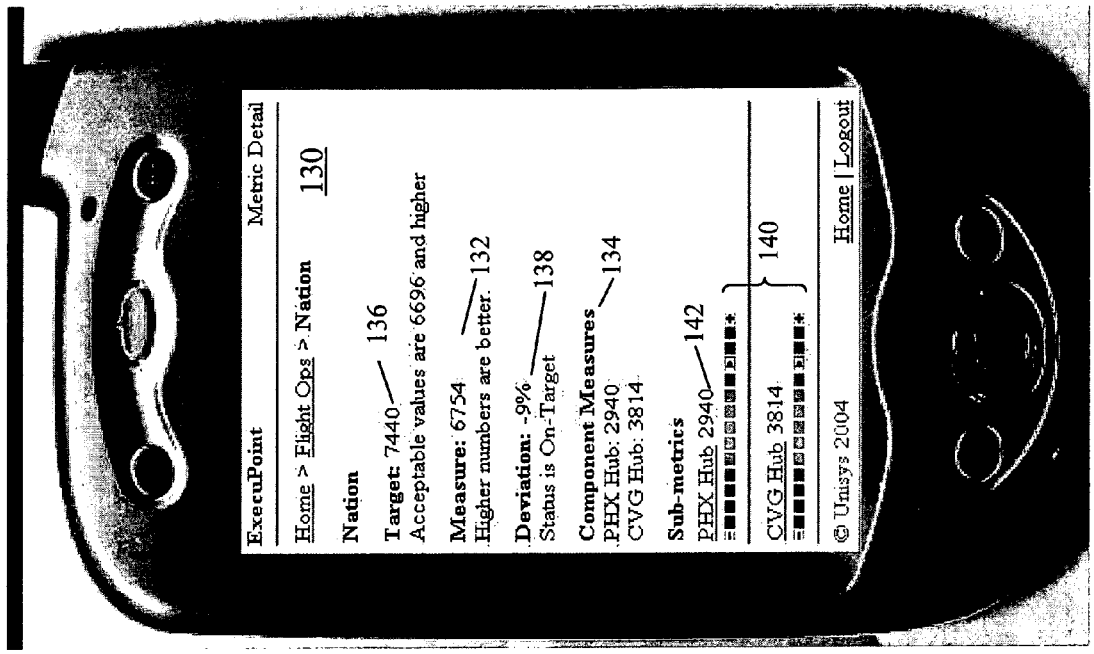
FIG. 7 illustrates a sample screen showing metric detail for a dimension of the selected industry including associated detail for that dimension displayed on a portable device that may be used in conjunction with the solution of the present invention.

FIG. 7 shows an example of current data statistics for critical business metrics related to the "Nation" dimension, in this case, on-time flight departures. As seen in FIG. 7, on-time flight departures are broken down into "Measure" 132 and "Component Measures" 134. "Measure" 132 is a measure of the on-time departures and for the airline business' national hubs, and the "Component Measures" 134 provides a breakdown of the "Measure" 132 numbers for a selected subset of the national hubs. In the example shown in FIG. 7, "Component Measures" 134 include on-time departures for each of Phoenix Sky Harbor International (PHX) and Cincinnati/Northern Kentucky International (CVG) Airports. "Measure" 132 and "Component Measures" 134 reflect the current operational status provided in real-time.

While the current operational status of any of these metrics is critical to the decision-maker, as discussed above, an important feature of the solution of the present invention not found in prior solutions is the presentation for a critical business metric category, the current operational data and state statistics of this data as compared and presented against history, trends, competitive analytics and/or objectives that are relevant to the business enterprise or some function, service or operation thereof. This ensures that decision makers have the most current state of the business enterprise combined with traditional decision support analytics and thus ensures more accurate and timely decisions.

Thus, as shown in FIG. 7, in addition to the current operational status of any of this metric, historical and business target objectives are shown. Thus, "Target" 136 might reflects the business target objectives for the airline for both the Phoenix Sky Harbor International (PHX) and Cincinnati/Northern Kentucky International (CVG) Airports, and "Deviation" 138 reflects the percentage that the "Measure" 132 deviates from the business target objective "Target" 136. In addition to numerical information, textual information is provided to guide the decision-maker. For example, as shown in FIG. 7, textual messages such as "Acceptable values [for "Measure" 132] are 6696 or better," "Higher numbers [for "Measure" 132] are better," and "Status is On-Target." In one embodiment of the present invention, the "Component Measures" are also graphically realized at 140 as a segmented bar graph using a dot, an arrow right, or an arrow left indicating no change, trend up or trend down, respectively.

Of course, other critical business metrics for the same category of critical business metrics could be used. Thus, instead of Phoenix Sky Harbor International (PHX) and Cincinnati/Northern Kentucky International (CVG) Airports, any other combination or permutation of hubs within the "Nation" dimension could be displayed. In addition, other information such an industry targets, national and business enterprise trends might be display in addition to, or instead of this information, subject to the selection of the business entity and limited only by the real estate of the mobile device 342. Furthermore, other textual and graphical representations may be used to present the same information without departing from the scope and spirit of the present invention.

Figure 8:
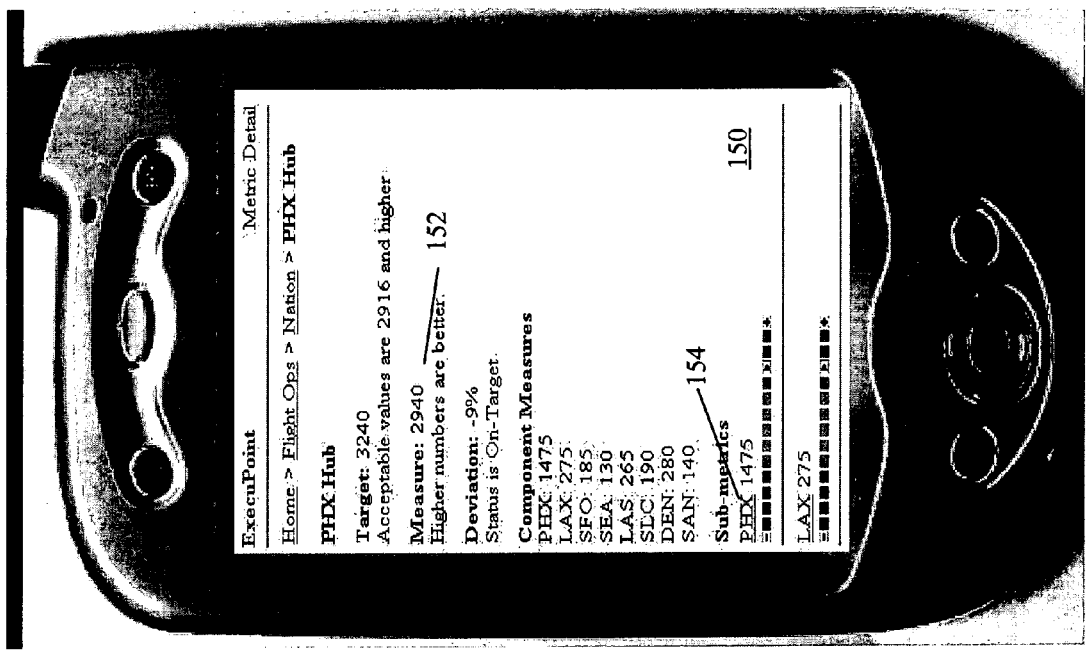
FIG. 8 illustrates a sample screen showing a critical business sub-metric associated with the dimension of FIG. 7 and associated detail for that critical business sub-metric displayed on a portable device that may be used in conjunction with the solution of the present invention.

If the user of the mobile device 342 wanted to be apprised of current, up-to-date business metrics specifically pertaining to Phoenix Sky Harbor International (PHX) Hub operations, he could select the PHX Hub sub-metric 142 link, which would bring up PHX Hub Metric screen 150 (FIG. 8). (The term "metric" and "sub-metric" are essentially interchangeable in that they both represent critical business metrics to a business entity. A "metric" may have one or more "sub-metrics" and further itself be a "sub-metric" to another "metric.")

It will be appreciated that PHX Hub Metric screen 150 and "Nation" dimension screen 130 are similar in providing "Measure," "Component Measures," "Target," and "Deviation" as well as associated text and graphics. However, PHX Hub Metric screen 150 displays only that real-time critical operational data and contextual information that is directly relevant to it. For example, "Measure" 152 shows the same current value for on-time departures as was shown in the PHX Hub sub-metric 142 on screen 130 (i.e., 2940)," but the "Component Measures" on screen 150 provides a breakdown of the on-time departures to and from the PHX Hub by originating/destination airport (e.g., as shown in FIG. 8, Phoenix Sky Harbor International Airport (PHX); Los Angeles International Airport (LAX); San Francisco International Airport (SFO); Seattle-Tacoma International Airport (SEA); Las Vegas McCarran International Airport (LAS); Salt Lake City International Airport (SLC); Denver International Airport (DEN); San Diego—Lindbergh Field (SAN))

In addition to these current operational states, historical and business target objectives are also shown. As with "Nation" dimension screen 130, historical and business target objectives are shown on PHX Hub Metric screen 150. For example, the "Target" for on-time departures is shown as "3240," and the "Deviation" is shown as "−9%," where deviation again represents the percentage that the "Measure" deviates from the business target objective "Target." In addition, similar to the "Nation" dimension screen 130, textual and graphical information are provided to guide the decision-maker.

Figure 9:
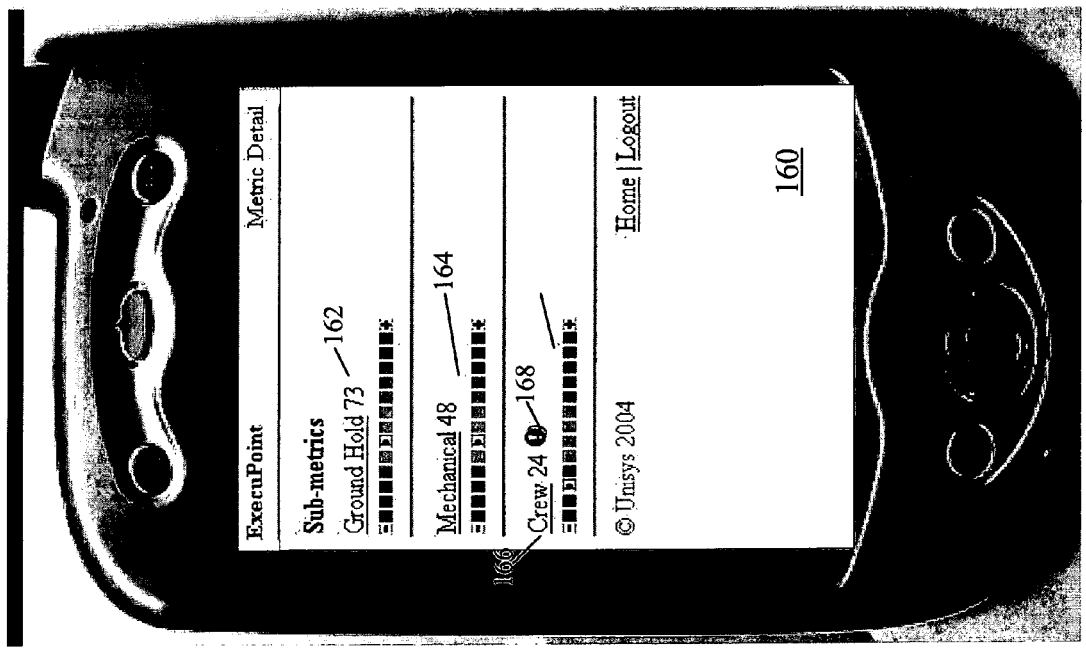
FIG. 9 illustrates a sample screen showing sub-metric data and information for a selected sub-metric of FIG. 8.

Should the user of the mobile device 342/decision-maker want further information on the specifics of the critical metrics of Phoenix Sky Harbor International (PHX) that, for example, negatively affect on-time departures from that airport, he/she could select the PHX sub-metric 154 link, which would result in sub-metrics of the PHX sub-metric being displayed on screen 160 (FIG. 9). As send therein, the sub-metrics of PHX sub-metric might include current data on ground hold sub-metric 162 (e.g., number of delays due to non-mechanical-related ground holds), mechanical sub-metric 164 (e.g., number of mechanically-related delays), and crew sub-metric 166 (e.g., number of crew unavailable), each of which can impact on-time departures from that airport. Of course, it will be recognized that other metrics could be used in addition to, or instead of, those shown in FIG. 9. Selection of any of these links will bring up a screen providing further details about that sub-metric.

For example, should the crew sub-metric 166 link be selected, the solution of the present invention will cause the mobile device 342 to display crew sub-metric screen 170 (FIG. 10) that provides detail about the alerted crew sub-metric 166. Again, "Measure," "Target," and "Deviation" information is provided; however there are not "Component Measures" that comprise the crew sub-metric 166, nor are they any further sub-metrics. As will be seen from the "Deviation" number and textual information accompanying it, the status of this metric is off by 48%.

In addition to the above information, as seen in screen 160, an "!" icon 168 is displayed alongside crew sub-metric 166. In one embodiment of the present invention, this is used to indicate that there is an alert in the crew sub-metric (that is, web application component 52 has detected a change within the critical business and KPI data related to this sub-metric, and accordingly, pushed a dynamic custom HTML or XML coded alert to the delivery services layer 70 the via an HTTP Post, which in turn, is communicated via delivery services layer 70 physical transmission tier 80 to the mobile device 342). Additionally, an "Alert information" link 172 is provided, the selection of which will cause Alert Information screen 180 (FIG. 11) to be displayed.

Figure 11:
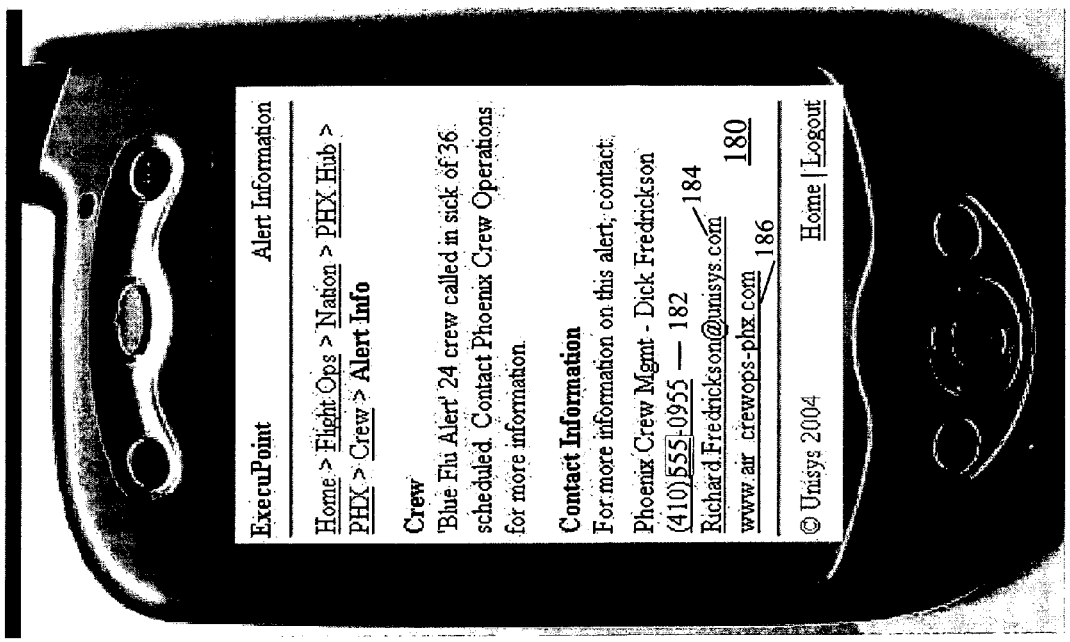
FIG. 11 illustrates a sample alert information screen for the alerted sub-metric of FIG. 10, including contact information and portal information.
Figure 12:
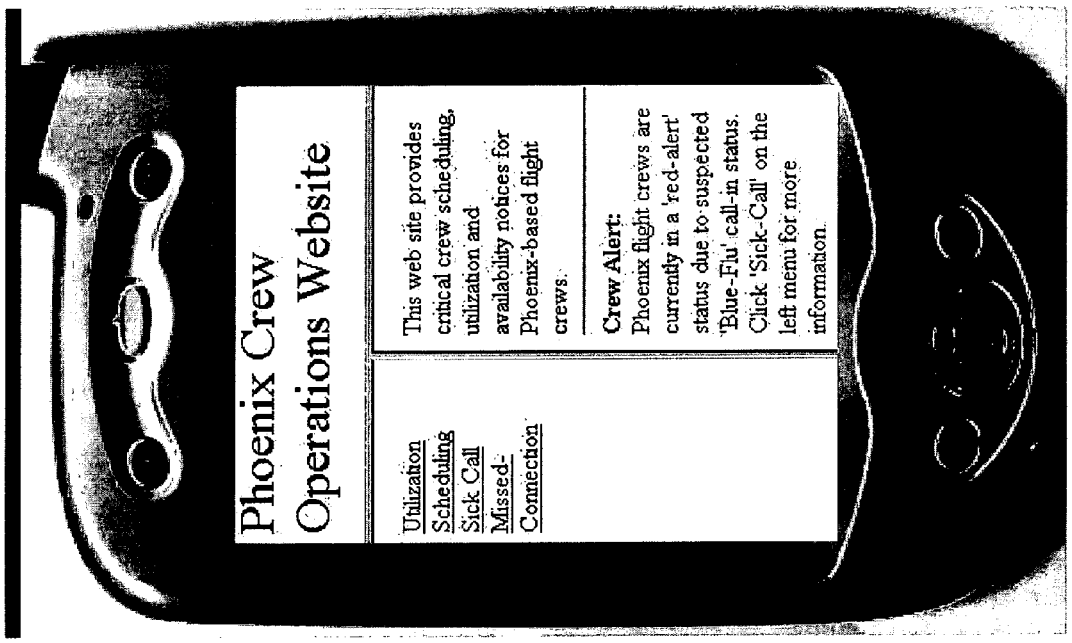
FIG. 12 illustrates a sample portal page screen selected from the alert information screen of FIG. 11.

In one embodiment of the present invention, Alert Information screen 180 provides several levels of information. First, it provides textual information explaining why the alert was generated. As seen in FIG. 11, although thirty-six (36) flight crewmembers were scheduled for duty, twenty-four (24) called in sick. Alert Information screen 180 also provides additional direction to the decision-maker to contact Phoenix Crew Operations for more information. Finally, in one embodiment of the present invention, Alert Information screen 180 provides three avenues of contact: Phone number link 182 for a contact person (landline or mobile); an e-mail address link 184 for that person; and, a portal link 186 to an outside web page for further information (e.g., a home web page such as shown in FIG. 12). If user selects any of these links, the solution of the present invention will automatically initiate the communications depending on the chosen link. It will be appreciated, that any other communications links could be, including but not limited to, paging, messaging, walkie-talkie, and facsimile communications.

Figure 13:
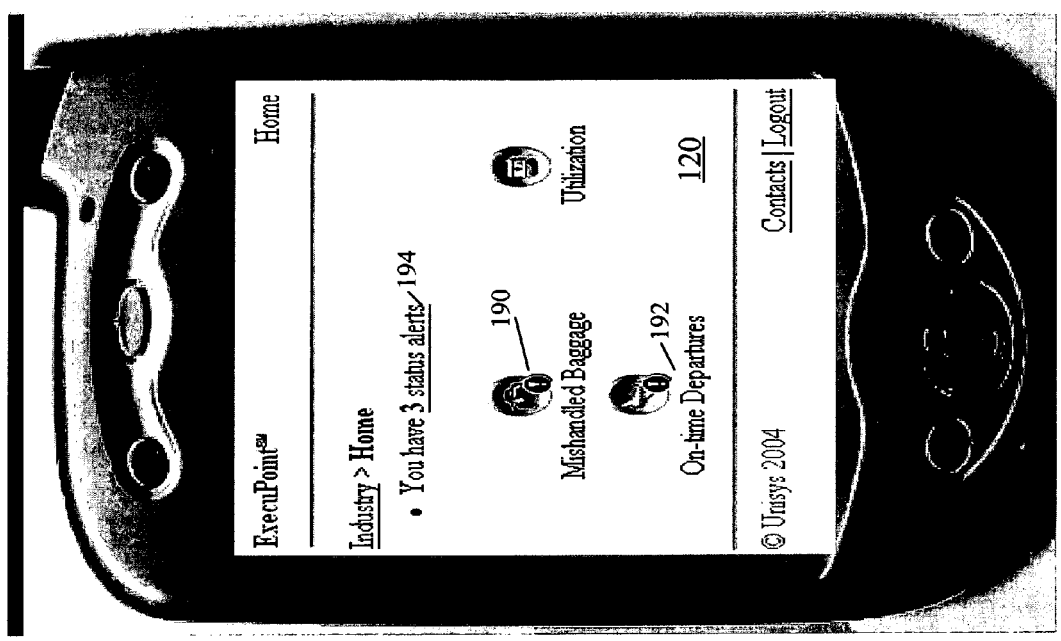
FIG. 13 illustrates a sample industry home screen showing the critical business metrics that have associated alerts that may be displayed on a portable device used in conjunction with the solution of the present invention.

An important feature of the solution of the present invention is that web application component 52 can "push" an alert to the mobile device 342 at any time, regardless of in what screen the device 342 is in, which allows the user to more quickly access and assess the affected critical business metric. For example, while an alert related to the crew sub-metric was displayed in, and alert information accessible, from screen sub-metric 170, the alert and related alert information may be displayed in, and alert information accessible from, any other screen. For example, as shown in FIG. 13, after the user has logged in, he/she might find that the home screen 120 indicates that two of the dimensions have associated alerts: Baggage Operations and Flight Operations. An important additional feature of the solution of the present invention is that, not only is it adapted to indicate that there is an alert with each of these dimensions, but it is further adapted to modify the icon to reflect in which critical business metric the alert has occurred. Thus, in FIG. 13, the Baggage Operations icon is modified to indicate an alerted "Mishandled Baggage" critical business metric 190, while Flight Operations is modified to indicate an alerted "On-Time Departure" critical business metric 192. Further, in one embodiment, the number of alerts is provided along with a link 194.

Figure 14:
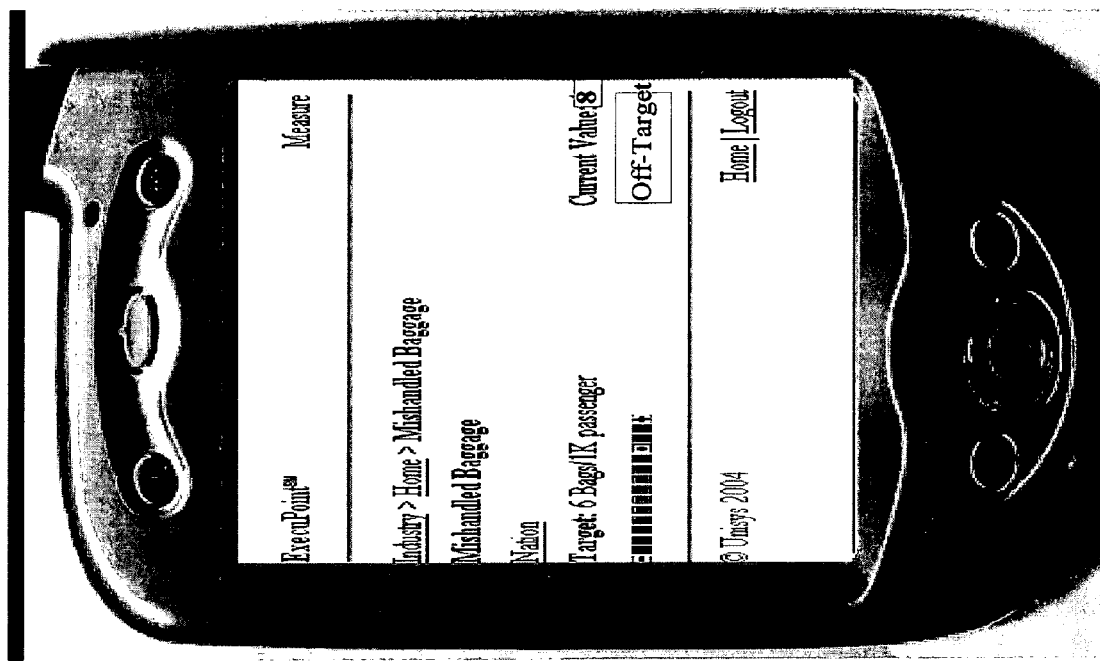
FIG. 14 illustrates a sample status critical business metrics screen selected from the industry home screen of FIG. 13.
Figure 15:
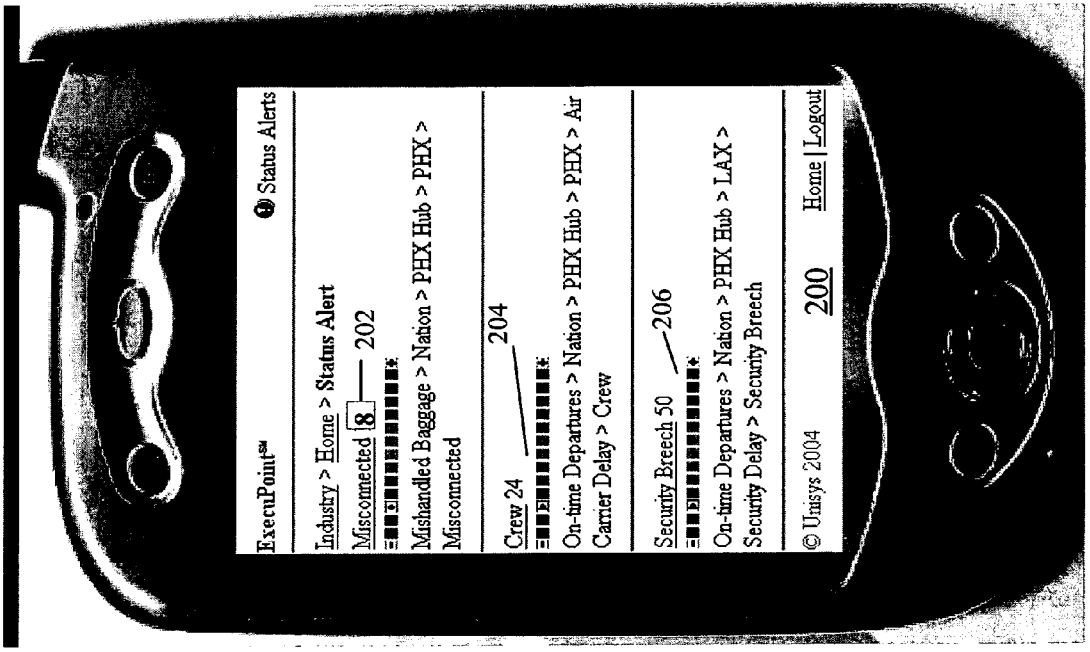
FIG. 15 illustrates a sample status alert screen selected from the industry home screen of FIG. 13.

If the user selected the "Mishandled Baggage" icon 190 he/she would be brought to a page providing details of the mishandled baggage (e.g., FIG. 14). Alternatively, if he/she selected the link associated with textual statement 194, a Status Alert screen 200 (FIG. 15) would be displayed which simply sets out each of the critical business metrics that has been alerted, their relation to other metrics, dimensions, and sub-metrics, in what hub and airport the alert occurred, and a graphical representation indicating (in this instance) a trend downwards. As seen in FIG. 15, the of the three alerts, one alert 202 is related to the mishandled baggage business at the Phoenix Sky Harbor International (PHX) Airport (the baggage being misconnected between flights), while two are related to the on-time departure critical business metric (one 204 related to a security breach at Los Angeles International (LAX) Airport; the other 206 to insufficient crew members for flights out of the Phoenix airport).

Figure 10:
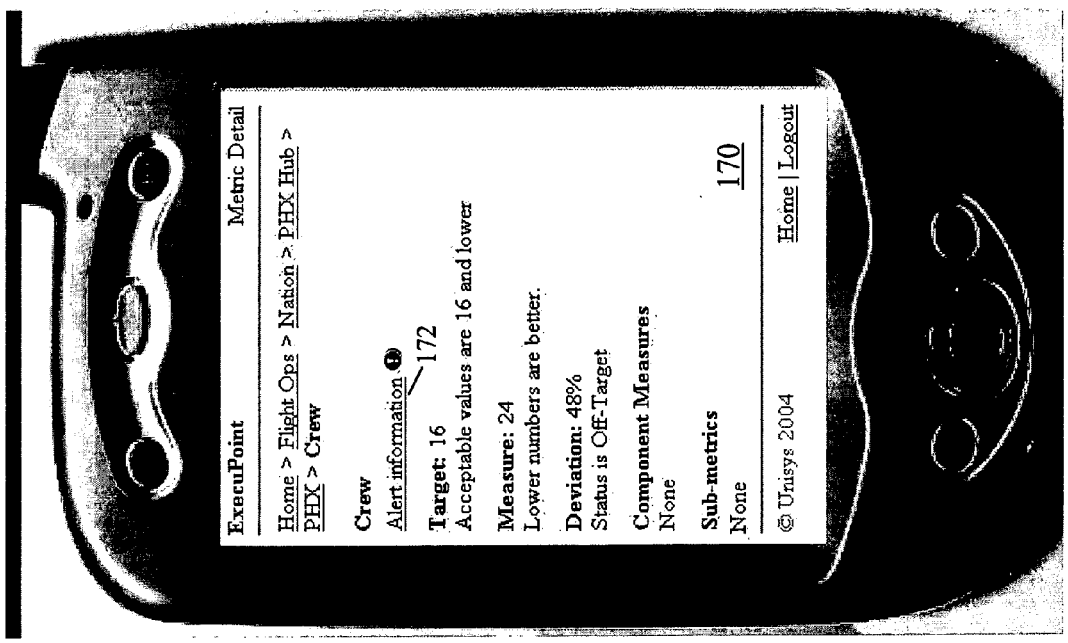
FIG. 10 illustrates a sample screen showing sub-metric data and information, including an alert indication.

Should any of the links associated with the alerted critical business metric be selected, the solution of the present invention will cause the mobile device 342 to display a screen that provides detail about the alerted critical business metric. Thus, for example, should the user select crew alert 204, the solution of the present invention would cause the mobile device 342 to display a display screen such as seen in FIG. 10.

Figure 16:
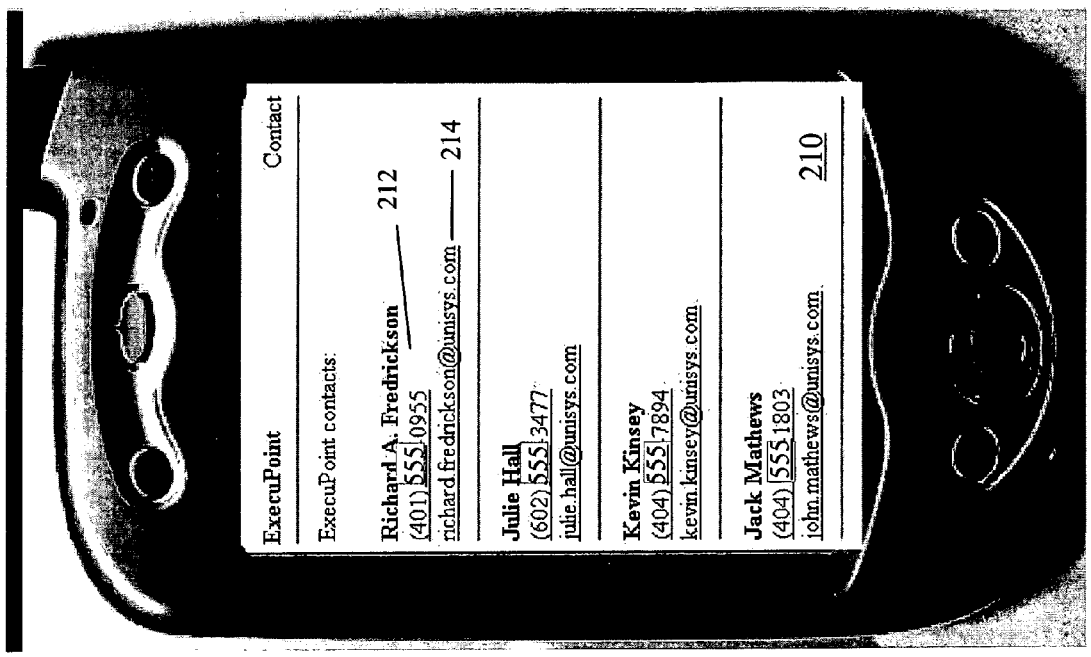
FIG. 16 illustrates a sample contact screen that may be displayed on a portable device used in conjunction with the solution of the present invention.

Finally, FIG. 16 illustrates a contact screen 210 which, in one embodiment of solution of the present invention, is accessible from any of the login screen 100, industry selection screen 110, or the industry home screen 120, although it will be appreciated that the solution of the present invention may be modified so that this screen 210 is accessible from any of the other screens as well. The information provided is similar to that provided on the Alert Information screen 180, and in one embodiment of the solution of the present invention includes at least one name, phone number link 212 for that contact person (landline or mobile) as well as an e-mail address link 214. If user selects either of these links, the solution of the present invention will automatically initiate the communications depending on the chosen link. It will be appreciated, that any other communications links could be, including but not limited to, paging, messaging, walkie-talkie, and facsimile communications.

Figure 17:
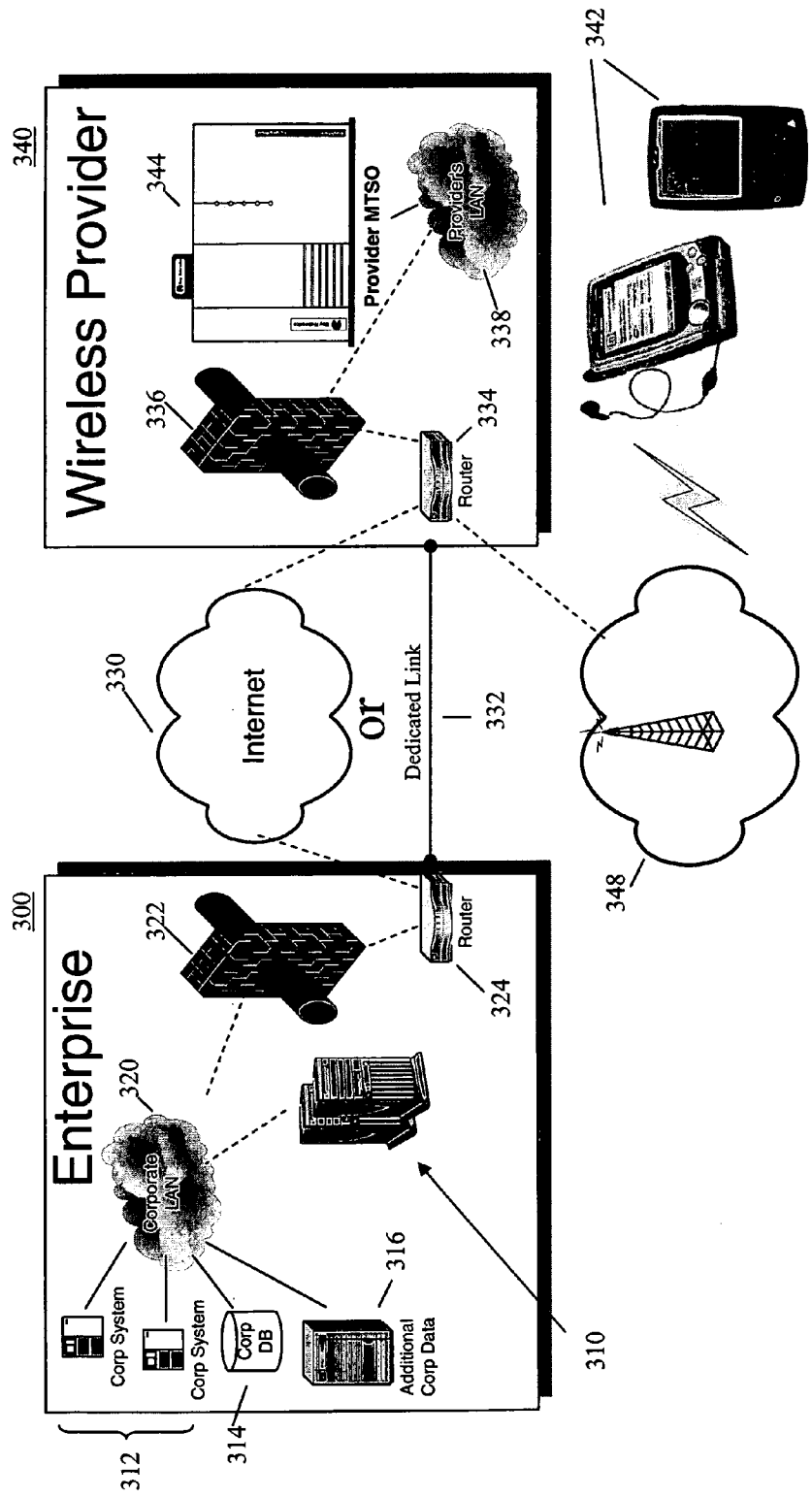
FIG. 17 is a block diagram showing one embodiment of an enterprise system for deploying one embodiment of the solution of the present invention.

Although one embodiment of the screens of the present invention is shown in FIGS. 4-15, they are merely exemplary. The display hardware, firmware and software may be configured in other ways to convey the information conveyed therein, without departing from the spirit and scope of the present invention. Further, one skilled in the art will recognize that any icon, textual or graphical representation may be used to represent an alert without departing from the scope and spirit of the invention, and that the icon, textual or graphical representation may be displayed anywhere on the display screen Enterprise System Deployment FIG. 17 sets forth an example of how the solution of the present invention may be deployed in a typical enterprise environment. As shown therein, business analytics and business intelligence information are provided in real-time from the business entity, or enterprise 300, to a web-enabled wireless portable device 342, such as a Palm-Pilot, BlackBerry® handheld, Pocket PC, or similar personal digital assistant (PDA), mobile or cellular phone, or any other similar portable device that is, or is adaptable to become, web-enabled, via wireless provider 340.

Enterprise 300 generally includes a number of business intelligence servers 310, which may be data warehouses that function to integrate with, and capture data from, diverse data sources within the enterprise (e.g., corporate systems 312, corporate-wide databases 314, and additional corporate data 316). Business intelligence servers 310 manage and, if necessary, derive the critical business metrics (e.g., KPI) and business intelligence from these disparate data sources and then deliver the information to the portable device 342. Although shown as one server in FIG. 17, it will be appreciated that a number of servers may be used, and that EAI services layer 30, analytics services layer 40 and delivery services layer 70 may all reside on one server or on separate servers.

At the request of client software (not shown) executing on portable device 342, information is served from business intelligence servers 310 via a corporate area network (LAN) 320 through tunneling software in enterprise firewall 322 to wireless provider router 324. Router 326 then either routes the information to the router 328 of the wireless provider 340 via the Internet 330 or a dedicated link 332 (e.g., DS0, ISDN, T1, T3, OC3, OC12, OC48, and/or OC96 lines, etc.). Wireless provider router 334 either routes the client request through tunneling software in firewall 336 and over wireless provider local area network 338 to its mobile telephone switching office (MTSO) 344 for connection to a landline network (not shown), or it sends the information out to the tower 348 to portable device 342, where the information is displayed in accordance with its application and operating system.

A main advantage of the solution of the present invention is the accessibility to information content presented in relevant context to enable better and more-timely decisions. Users are provided real-time information on the current state of their business performance and in the same view given comparison information that quickly highlights the meaning of each data element.

Therefore, it will be appreciated that the solution of the present invention provides critical business operational data and other business intelligence information to decision-maker in a dynamic, real-time, mobile environment, allowing the decision-maker to effectively evaluate and then act on this information in a timely manner. It does so in the context of important historical, analytical, competitive analytics, trends, and performance objectives, in order that the action that the decision-maker makes is more informed and thus more effective. Finally, by providing the solution over a platform-independent, flexible architecture, applications executing within the solution environment may be changed, modified, upgraded, enhanced or deleted without requiring change or replacement of the underlying solution infrastructure, and legacy software and applications may be easily interchanged within the solution infrastructure While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for accessing data and information stored in at least one multi-dimensional database, the system comprising:
    a mobile integration engine application services component for reading and translating the accessed data and information, and for creating markup language describing the accessed data and information for presentation to a web-enabled application;
    wherein the accessed data and information including data and information relating to critical business metrics and data relational rules that govern the relationship of the data, and for presenting the accessed data and information to the web-enabled application; and
    the stored data and information are arranged in a plurality of dimensions, each of the plurality of dimensions having at least one child level representing a measure of the dimension, wherein the mobile integration engine application services component determines whether the measure of a first dimension is associated with any other of the plurality of dimensions, and wherein the orthogonal drill mechanism creates a drill-across path from the at least one child level of the first dimension to the child level representing the measure of each of the other dimensions if it is determined that the measure is associated with the other dimension, the drill-across path allowing navigation between the at least one child level of the first dimension and the child level of each of the other dimensions.

2. The system of claim 1, wherein the system accesses the at least one multi-dimensional database via an application programming interface (API).

3. The system of claim 1, wherein the mobile integration engine application services component is a stand-alone application.

4. The system claim 1, wherein the web-enabled application is a browser-based application.

5. The system of claim 4, wherein the markup language is selected from the group consisting of XML and HTML.

6. The system of 1, wherein the mobile integration engine application services component includes an orthogonal drill component including an orthogonal drill mechanism for reading and translating the data relational rules.

7. The system of claim 6, wherein the mobile integration engine application services component provides a secure interface for identifying and authenticating the critical business metrics from the at least one multi-dimensional database.

8. The system of claim 7, wherein the mobile integration engine application services component determines access to the critical business metrics.

9. The system of claim 1, wherein the mobile integration engine application services component stops the drill mechanism along the drill path for a consolidation of the data and information relating to the measure.

10. The system of claim 9, wherein the mobile integration engine application services component uses the markup language to describe the measure at the at least one child level of the first dimension and at the child level of each of the other dimensions along the drill-path.

11. The system of claim 1, wherein the mobile integration engine application services component manages the data and information relating to the critical business metrics and monitors changes in the value of the data and information.

12. The system of claim 11, wherein the mobile integration engine application services component pushes dynamic alerts and messaging based on the deviation of the value of the data and information from an alert threshold.

13. A mobile integration engine application services component executed on a computer for accessing data and information stored in at least one multi-dimensional database, the mobile integration engine application services component comprising:

orthogonal drill logic and database access means for accessing the stored data and information, the accessed data and information including data and information relating to critical business metrics and data relational rules that govern the relationship of the critical business metric data; and application means for creating markup language that describes the accessed data and information;

wherein the stored data and information are arranged in a plurality of dimensions, each of the plurality of dimensions having at least one child level representing a measure of the dimension, the orthogonal drill logic and database access means including an orthogonal drill mechanism, the orthogonal drill mechanism reading and translating the data relational rules determining whether the measure of a first dimension is associated with any of the other plurality of dimensions, and, creating a drill-across path from the at least one child level of the first dimension to a child level representing the measure of any other dimension if it is determined that the measure is associated with the other dimension, the drill-across path allowing navigation between the at least one child level of the first dimension and the child level of the other dimension.

14. The mobile integration engine application services component of claim 13, wherein the mobile integration engine application services component is a stand-alone application.

15. The mobile integration engine application services component claim 13, wherein the application means further presents the markup language to a web-enabled application.

16. The mobile integration engine application services component of claim 15, wherein the web-enabled application is a browser-based application.

17. The mobile integration engine application services component of claim 13, wherein the orthogonal drill logic and database access means accesses the at least one multi-dimensional database via an application programming interface (API).

18. The mobile integration engine application services component of claim 17, wherein the orthogonal drill logic and database access means is implemented the using Java factory and data access object design patterns.

19. The mobile integration engine application services component of claim 18, wherein the orthogonal drill logic and database access means comprises:

a Java-call interface component for interacting with the structure of the data and information in the at least one multi-dimensional database.

20. The mobile integration engine application services component of claim 18, wherein the at least one multi-dimensional database includes a SQL-compliant database, the orthogonal drill logic and database access means further comprises:

a Java database connectivity component for allowing a Java program to interact with the SQL-compliant database.

21. The mobile integration engine application services component of claim 18, wherein the at least one multi-dimensional database is adapted to interface with an enterprise messaging system, the orthogonal drill logic and database access means further comprises:

a Java message service interface component for supporting the enterprise messaging system.

22. The mobile integration engine application services component of claim 13, wherein the mobile integration engine application services component uses the mark-up language to describe the measure at the at least one child level of the first dimension and at the child level of each of the other dimensions along the drill-path.

23. The mobile integration engine application services component of claim 22, wherein the mobile integration engine application services component stops the drill mechanism along the drill path for a consolidation of the data and information relating to the measure.

24. The mobile integration engine application services component of claim 13, wherein the application means manages the data and information received from the orthogonal drill logic and database access means and relating to the critical business metrics, and monitors changes in the value of the data and information.

25. The mobile integration engine application services component of claim 24, wherein the application means pushes dynamic alerts and messaging based on the deviation of the value of the data and information from an alert threshold.

26. The mobile integration engine application services component of claim 13, wherein the application means is compliant with the Model-View-Controller (MVC) paradigm.

27. The mobile integration engine application services component of claim 13, further comprising:
   administration application means for providing definitions of the critical business metric to the application means.

28. The mobile integration engine application services component of claim 27, wherein the administration application means provides a secure interface for identifying and authenticating the critical business metrics from the at least one multi-dimensional database.

29. The mobile integration engine application services component of claim 27, wherein the administration application means determines access to the critical business metrics.

30. A mobile integration engine application services component executed on a computer for accessing data and information stored in a plurality of dimensions in at least one multi-dimensional database, each of the plurality of dimensions having at least one child level representing a measure of the dimension, the mobile integration engine application services component comprising:
   an orthogonal drill logic and database access component for accessing the stored data and information, the accessed data and information including data and information relating to critical business metrics and data relational rules that govern the relationship of the critical business metric data, the orthogonal drill logic and database access component including an orthogonal drill mechanism determining whether the measure of a first dimension is associated with any of the other plurality of dimensions, and, creating a drill-across path from the at least one child level of the first dimension to a child level representing the measure of each of the any other dimensions if it is determined that the measure is associated with the other dimension, the drill-across path allowing orthogonal navigation between the at least one child level of the first dimension and the child level of each of the other dimensions; and,
   a web application component for creating markup language that describes the accessed data and information, the web application component adapted to communicate the markup language to a browser-based application;
   wherein the stored data and information are arranged in a plurality of dimensions, each of the plurality of dimensions having at least one child level representing a measure of the dimension, the orthogonal drill logic and database access means including an orthogonal drill mechanism, the orthogonal drill mechanism reading and translating the data relational rules, determining whether the measure of a first dimension is associated with any of the other plurality of dimensions, and, creating a drill-across path from the at least one child level of the first dimension to a child level representing the measure of any other dimension if it is determined that the measure is associated with the other dimension, the drill-across path allowing navigation between the at least one child level of the first dimension and the child level of the other dimension.

31. The mobile integration engine application services component of claim 30, wherein the web application component uses the markup language to describe the measure at the at least one child level of the first dimension and at the child level of each of the other dimensions along the drill-path, and stops the drill mechanism along the drill path for a consolidation of the data and information relating to the measure.

32. The mobile integration engine application services component of claim 30, wherein the web application component manages the data and information received from the orthogonal drill logic and database access component relating to the critical business metrics, monitors changes in the value of the data and information and pushes dynamic alerts and messaging based on the deviation of the value of the data and information from an alert threshold.

33. The mobile integration engine application services component of claim 30, further comprising:
   an administration application component for providing for providing provides a secure interface for identifying and authenticating the critical business metrics from the at least one multi-dimensional database and for determining access to the critical business metrics.

* * * * *